(12) United States Patent
Hwang

(10) Patent No.: US 12,346,560 B2
(45) Date of Patent: Jul. 1, 2025

(54) STORAGE DEVICE OPERATING IN ZONE UNIT AND DATA PROCESSING SYSTEM INCLUDING THE SAME

(71) Applicant: SAMSUNG ELECTRONICS CO., LTD., Suwon-si (KR)

(72) Inventor: Jooyoung Hwang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 199 days.

(21) Appl. No.: 18/055,440

(22) Filed: Nov. 15, 2022

(65) Prior Publication Data

US 2023/0152973 A1 May 18, 2023

(30) Foreign Application Priority Data

Nov. 15, 2021 (KR) .......................... 10-2021-0157090
Mar. 29, 2022 (KR) .......................... 10-2022-0039173

(51) Int. Cl.
*G06F 3/06* (2006.01)
*G06F 12/10* (2016.01)

(52) U.S. Cl.
CPC ............ *G06F 3/0608* (2013.01); *G06F 3/064* (2013.01); *G06F 3/0679* (2013.01); *G06F 12/10* (2013.01)

(58) Field of Classification Search
CPC ...... G06F 3/0608; G06F 3/0604; G06F 3/064; G06F 3/0679; G06F 12/10
USPC ................................ 711/103, 154, E12.001
See application file for complete search history.

(56) References Cited

U.S. PATENT DOCUMENTS

| 8,954,693 | B2 | 2/2015 | Seo et al. |
| 9,383,924 | B1 | 7/2016 | Fullbright et al. |
| 9,772,936 | B2 | 9/2017 | Klein |
| 9,830,079 | B2 | 11/2017 | Kanno |
| 9,984,090 | B1 | 5/2018 | Shang et al. |
| 10,216,754 | B1 | 2/2019 | Douglis et al. |
| 10,719,253 | B2 | 7/2020 | Alkalay et al. |
| 11,418,555 | B1 * | 8/2022 | Cafaro .................. H04L 65/612 |
| 2012/0089781 | A1 * | 4/2012 | Ranade ................. G06F 16/183 |
| | | | 711/E12.001 |
| 2019/0324680 | A1 * | 10/2019 | Jung ...................... G06F 3/0655 |

(Continued)

FOREIGN PATENT DOCUMENTS

| KR | 10-1379048 | 3/2014 |
| KR | 10-1862341 | 5/2018 |

OTHER PUBLICATIONS

EESR Dated Mar. 30, 2023 in Corresponding EP Patent Application No. 22206069.1.

*Primary Examiner* — Yaima Rigol
*Assistant Examiner* — Edward Waddy, Jr.
(74) *Attorney, Agent, or Firm* — MORGAN, LEWIS & BOCKIUS LLP

(57) ABSTRACT

A storage device includes a memory device including a plurality of memory blocks, and a memory controller. The memory controller is configured to control a memory operation performed on the memory device by dividing the plurality of memory blocks into a plurality of superblocks. The memory controller is further configured to write a first compressed chunk generated by compressing a first chunk including data requested by a host to be written to a first superblock selected based on a first logical address received from the host among the plurality of superblocks, and generate a location-related offset of the first compressed chunk in the first superblock.

18 Claims, 20 Drawing Sheets

(56) References Cited

U.S. PATENT DOCUMENTS

| | | |
|---|---|---|
| 2020/0167274 A1 | 5/2020 | Bahirat et al. |
| 2020/0371709 A1 | 11/2020 | Jean |
| 2021/0004157 A1 | 1/2021 | O Mahony et al. |
| 2021/0182166 A1 | 6/2021 | Hahn et al. |
| 2021/0303171 A1* | 9/2021 | Chen .................. G06F 3/0679 |
| 2021/0303185 A1 | 9/2021 | Mishra et al. |
| 2021/0349632 A1 | 11/2021 | Yoshida et al. |
| 2022/0244869 A1* | 8/2022 | Kanteti .............. G06F 3/0631 |
| 2022/0350530 A1* | 11/2022 | Yoshida ............. G06F 3/0656 |

* cited by examiner

STORAGE DEVICE OPERATING IN ZONE UNIT AND DATA PROCESSING SYSTEM INCLUDING THE SAME

CROSS-REFERENCE TO RELATED APPLICATIONS

This application is based on and claims priority under 35 U.S.C. § 119 to Korean Patent Application Nos. 10-2021-0157090 and 10-2022-0039173, filed on Nov. 15, 2021, and Mar. 29, 2022, respectively, in the Korean Intellectual Property Office, the disclosures of which are incorporated by reference herein in their entireties.

TECHNICAL FIELD

Embodiments of the inventive concept relate to a storage device and a data processing system, and more particularly, to a storage device supporting a zoned namespace interface and a data processing system including the storage device.

DISCUSSION OF RELATED ART

A storage device may be a memory system, and may store data based on a request from a host, such as a mobile terminal such as, for example, a computer, a smartphone, a tablet, or various other types of electronic devices. The storage device may include, for example, a hard disk drive, a solid state drive, a universal flash storage (UFS) device, an embedded multimedia card (eMMC), etc.

SUMMARY

Embodiments of the inventive concept provide a storage device which supports a compression function that efficiently uses a small memory space for converting a logical address into a physical address to write or read data received from a host, and a data processing system including the storage device.

According to an embodiment of the inventive concept, a storage device includes a memory device including a plurality of memory blocks, and a memory controller. The memory controller is configured to control a memory operation performed on the memory device by dividing the plurality of memory blocks into a plurality of superblocks, write a first compressed chunk generated by compressing a first chunk including data requested by a host to be written to a first superblock selected based on a first logical address received from the host among the plurality of superblocks, and generate a location-related offset of the first compressed chunk in the first superblock.

According to an embodiment of the inventive concept, a data processing system includes a storage device including a plurality of memory blocks and configured to perform a memory operation by dividing the plurality of memory blocks into a plurality of superblocks, and a host processor. The host processor is configured to operate the storage device in a zoned namespace, recognize the storage device as a plurality of zones, each including a plurality of chunks, and provide a memory operation request to the storage device. The storage device is further configured to write a plurality of compressed chunks generated by compressing the plurality of chunks to the plurality of superblocks respectively corresponding to the plurality of zones, and manage location-related offsets of the plurality of compressed chunks in the plurality of superblocks.

According to an embodiment of the inventive concept, a storage device includes a memory device including a plurality of memory blocks, and a memory controller. The memory controller is configured to control a memory operation performed on the memory device by dividing the plurality of memory blocks into a plurality of superblocks, write a first compressed chunk generated by compressing a first chunk including first data requested by a host to be written to a first superblock selected based on a first logical address received from the host among the plurality of superblocks, and transmit first information indicating a current first available capacity of the first superblock to the host.

BRIEF DESCRIPTION OF THE DRAWINGS

Embodiments of the inventive concept will be more clearly understood from the following detailed description taken in conjunction with the accompanying drawings, in which.

DETAILED DESCRIPTION OF THE EMBODIMENTS

Figure 1:
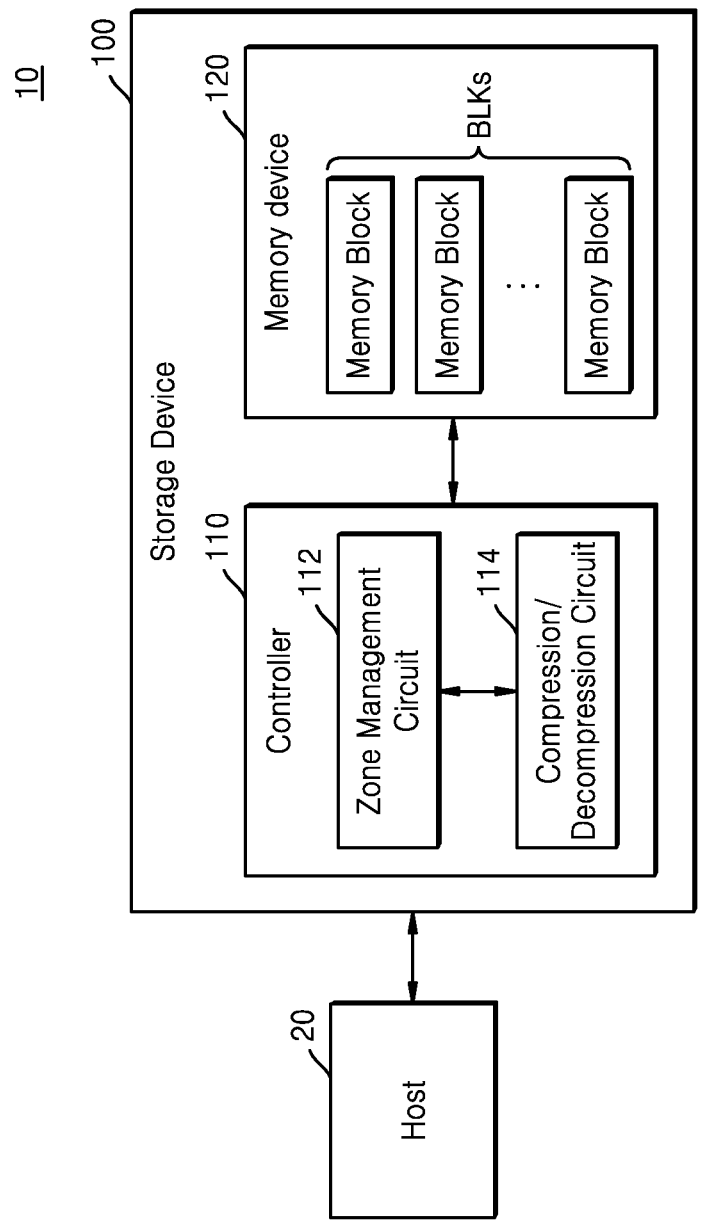
FIG. 1 is a block diagram illustrating a data processing system according to an embodiment of the inventive concept.

Embodiments of the inventive concept will be described more fully hereinafter with reference to the accompanying drawings. Like reference numerals may refer to like elements throughout the accompanying drawings.

It will be understood that the terms "first," "second," "third," etc. are used herein to distinguish one element from another, and the elements are not limited by these terms. Thus, a "first" element in an embodiment may be described as a "second" element in another embodiment.

It should be understood that descriptions of features or aspects within each embodiment should typically be considered as available for other similar features or aspects in other embodiments, unless the context clearly indicates otherwise.

As used herein, the singular forms "a", "an" and "the" are intended to include the plural forms as well, unless the context clearly indicates otherwise.

It will be understood that when a component such as a film, a region, a layer, etc., is referred to as being "on", "connected to", "coupled to", or "adjacent to" another component, it can be directly on, connected, coupled, or adjacent to the other component, or intervening components may be present. It will also be understood that when a component is referred to as being "between" two components, it can be the only component between the two components, or one or more intervening components may also be present. It will also be understood that when a component is referred to as "covering" another component, it can be the only component covering the other component, or one or more intervening components may also be covering the other component. Other words used to describe the relationships between components should be interpreted in a like fashion.

Figure 2A:
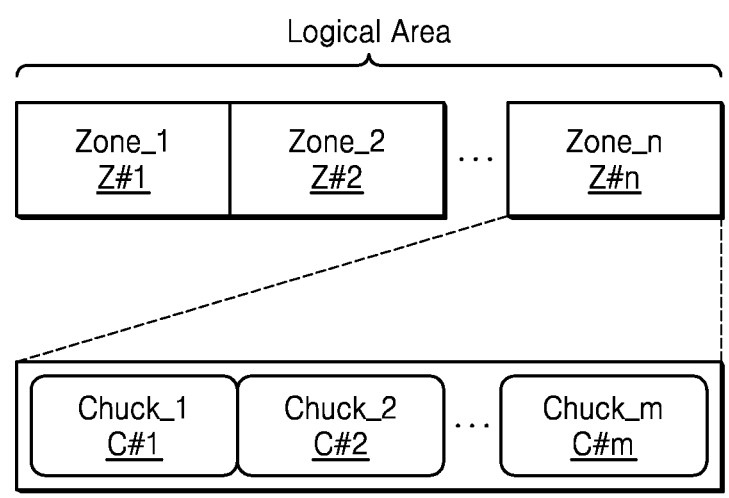
FIGS. 2A and 2B are diagrams illustrating a logical area and a physical area related to a memory operation of a storage device according to an embodiment of the inventive concept.
Figure 2B:
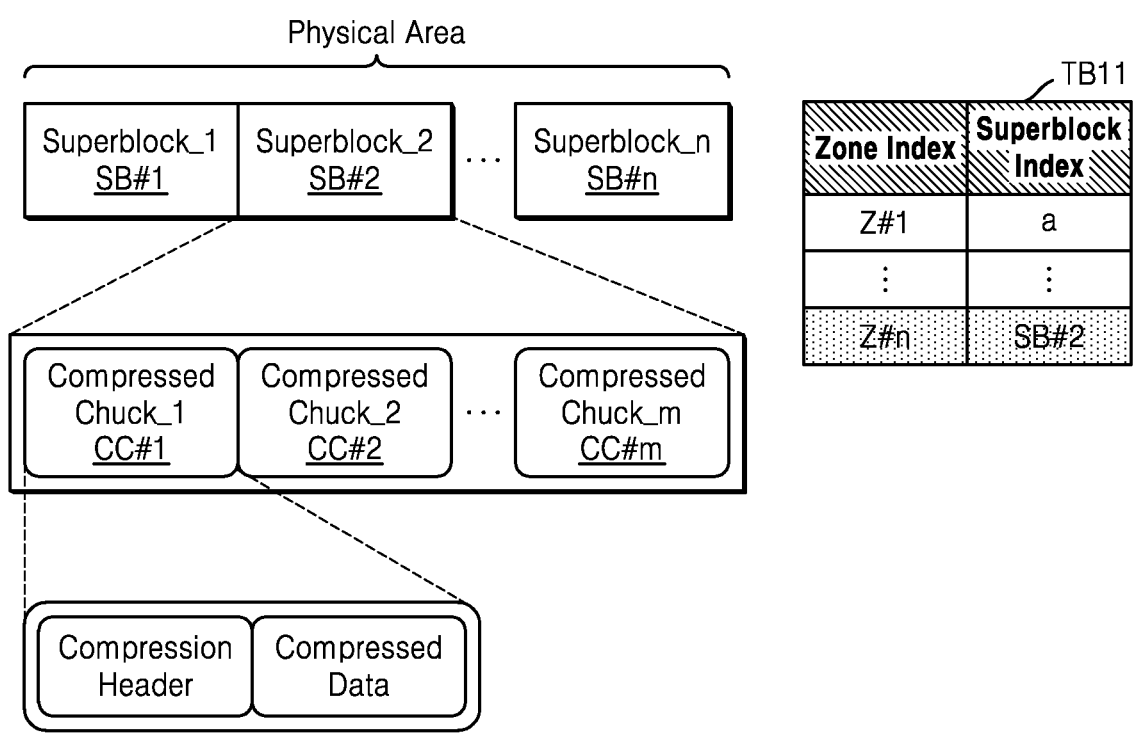

FIG. 1 is a block diagram illustrating a data processing system 10 according to an embodiment of the inventive concept. FIGS. 2A and 2B are diagrams illustrating a logical area and a physical area related to a memory operation of a storage device 100 according to an embodiment of the inventive concept.

Referring to FIG. 1, the data processing system 10 may include a host 20 and the storage device 100. The host 20 is a data processing device and may be any one of, for example, a central processing unit (CPU), a graphics processing unit (GPU), a neural processing unit (NPU), etc. In the present specification, the host 20 may also be referred to as a host processor or a host device. The host 20 may communicate with the storage device 100 to write data generated while performing a data processing operation to the storage device 100 or to read data utilized for a processing operation from the storage device 100. The host 20 may communicate with the storage device 100 by using at least one of various communication methods such as, for example, universal serial bus (USB), serial advanced technology attachment (SATA), small computer system interface (SCSI), serial attached SCSI (SAS), high speed interchip (HSIC), peripheral component interconnection (PCI), PCI express (PCIe), or non-volatile memory express (NVMe) communication methods. However, embodiments of the inventive concept are not limited thereto.

The storage device 100 may include a memory controller 110 and a memory device 120. The memory controller 110 may control a memory operation and a background operation performed on the memory device 120. For example, the memory operation may include a write operation (or a program operation), a read operation, and an erase operation. For example, the background operation may include at least one of a garbage collection operation, a wear leveling operation, a bad block management operation, etc.

In an embodiment, the memory device 120 may be implemented in various types, such as, for example, NAND flash memory, NOR flash memory, resistive random access memory (RRAM), phase-change memory (PRAM), magnetoresistive random access memory (MRAM), ferroelectric random access memory (FRAM), spin transfer torque random access memory (STT-RAM), etc. Hereinafter, embodiments of the inventive concept are described with respect to an example in which the memory device 120 is implemented as NAND flash memory, and specific implementation examples of the NAND flash memory are described below with reference to FIGS. 12A to 13.

In an embodiment, the memory controller 110 may include a zone management circuit 112 and a compression/decompression circuit 114. Although it is disclosed with reference to FIG. 1 that the zone management circuit 112 and the compression/decompression circuit 114 are included in in the memory controller 110, embodiments of the inventive concept are not limited thereto. For example, according to embodiments, the memory controller 110 may directly perform the operation of the zone management circuit 112 and the compression/decompression circuit 114 without inclusion of the zone management circuit 112 and the compression/decompression circuit 114. Moreover, the zone management circuit 112 and the compression/decompression circuit 114 may be implemented as, for example, hardware logic or software logic, and may be executed by the memory controller 110.

The zone management circuit 112 may support zoned namespace technology for the host 20 to divide and use a plurality of memory blocks BLKs in a zone unit. In the present specification, a namespace refers to the size of a nonvolatile memory that may be formatted as a logical area (or a logical block) at one time. Based on the zoned namespace technology, the storage device 100 may sequentially perform a write operation on each of a plurality of zones, in response to a request from the host 20. For example, when the host 20 executes a first application program, because data with respect to a first application may be written to a first zone allocated to the first application, properties of the data written to the first zone may be similar. Also, logical addresses of logical pages included in one zone are consecutive, and the zone management circuit 112 may sequentially write data to logical pages.

Referring to FIG. 2A, the logical area may include first to n-th zones Z #1 to Z # (where n is an integer greater than or equal to 1). The host 20 may request a memory operation from the storage device 100 by recognizing the plurality of memory blocks BLKs of the memory device 120 as the first to n-th zones Z #1 to Z #n. Each of the first to n-th zones Z #1 to Z #n may include a plurality of logical pages, and each of the first to n-th zones Z #1 to Z #n may have the same size as one another. Also, an application program executed by the host 20 may correspond to at least one zone. First to m-th chunks C #1 to C #m (where m is an integer greater than or equal to 1) may be virtually written to the n-th zone Z #n. The first to m-th chunks C #1 to C #m may have sequential logical addresses based on an index. Accordingly, data may be sequentially written to the first to m-th chunks C #1 to C #m in a direction from a low index to a high index. In the present specification, a virtual write operation is a write operation recognized by the host 20, and the host 20 may recognize that data requested to be written to the storage device 100 by the host 20 is included in a specific chunk of a specific zone. The storage device 100 may actually compress the first to m-th chunks C #1 to C #m and respectively write the same to the plurality of memory blocks BLKs. In the present specification, a chunk may be defined as a data set written to a preset number of logical pages or a data unit including a preset number of logical pages. Each of the first to m-th chunks C #1 to C #m may have the same size as one another. The embodiment of the n-th zone Z #n may also be applied to the first to n−1th zones Z #1 to Z #(n−1).

Referring to FIG. 2B, the physical area may include first to n-th superblocks SB #1 to SB #n. Each of the first to n-th superblocks SB #1 to SB #n may include a plurality of physical pages, and each of the first to n-th superblocks SB #1 to SB #n may have the same size as one another. The plurality of memory blocks BLKs of the memory device 120 may be divided into the first to n-th superblocks SB #1 to SB #n. For example, one superblock may include at least one memory block. The first to n-th superblocks SB #1 to SB #n may respectively correspond to the first to n-th zones Z #1 to Z #n. The zone management circuit 112 may manage a zone mapping table TB11 indicating mapping relationships between the first to n-th zones Z #1 to Z #n, which are logical areas, and the first to n-th superblocks SB #1 to SB #n, which are physical areas. For example, similar to the zone mapping table TB11, the n-th zone Z #n may be mapped to the second superblock SB #2. As the storage device 100 performs a memory operation, the n-th zone Z #n may be mapped to a superblock other than the second superblock SB #2, and the zone management circuit 112 may update the zone mapping table TB11 based on a changed mapping relationship. In some embodiments, in the storage device 100, instead of the zone mapping table TB11, fixed mapping relationships between the first to n-th zones Z #1 to Z #n and the first to n-th superblocks SB #1 to SB #n may be defined, and in this case, the zone mapping table TB11 may be omitted.

In an embodiment, the first to m-th compressed chunks CC #1 to CC #m may be written to the second superblock SB #2. The first to m-th compressed chunks CC #1 to CC #m may have sequential physical addresses with respect to the index. Accordingly, the first to m-th compressed chunks CC #1 to CC #m may be sequentially written from a low index to a high index. The compression/decompression circuit 114 may compress the first to m-th chunks C #1 to C #m of the n-th zone Z #n, respectively, generate the first to m-th compressed chunks CC #1 to CC #m, and write the generated first to m-th compressed chunks CC #1 to CC #m to the second superblock SB #2. In an embodiment, the first to m-th compressed chunks CC #1 to CC #m may be based on at least one of a plurality of compression algorithms. The sizes of the first to m-th compressed chunks CC #1 to CC #m may be the same as or different from each other. For example, the size of the first compressed chunk CC #1 based on a first compression algorithm may be different from that of the second compressed chunk CC #2 based on a second compression algorithm. In another example, the first compressed chunk CC #1 and the second compressed chunk CC #2 based on the same algorithm may have the same size as each other.

In an embodiment, the first compressed chunk CC #1 may include a compression header and compressed data. For example, the compression header may include at least one of a compression algorithm of the first compressed chunk CC #1, the size of the first compressed chunk CC #1, and the number of logical pages included in the first chunk (C #1, FIG. 2A) corresponding to the first compressed chunk CC #1. The compressed data may be compressed from the first chunk (C #1, FIG. 2A). In an embodiment, the compression/decompression circuit 114 may first read the compression header and perform a decompression operation on the compressed data based on the read compression header. The configuration example of the first compressed chunk CC #1 may also be applied to the second to m-th compressed chunks CC #2 to CC #m, and embodiments of the second superblock SB #2 may also be applied to the first and third to n-th superblocks SB #1 and SB #3 to SB #n.

Referring back to FIG. 1, in an embodiment, the zone management circuit 112 may generate location-related offsets of compressed chunks in superblocks. For example, the zone management circuit 112 may update a compressed chunk mapping table based on the location-related offsets of the generated compressed chunks. In another example, the zone management circuit 112 may transmit address information including the location-related offsets of the generated compressed chunks to the host 20.

In an embodiment, the compressed chunks are generated by compressing chunks, and, unlike chunks including logical pages, may not be page-aligned and may be in a byte-aligned state. Thus, the location-related offsets of the compressed chunks may correspond to byte-aligned offsets. In an embodiment, the location-related offsets of the compressed chunks may include a start physical address of the compressed chunks in the superblocks respectively including the compressed chunks.

In an embodiment, the zone management circuit 112 may transmit information indicating additionally secured available capacities of superblocks to the host 20 by writing the compressed chunks to the superblocks. Because the host 20 recognizes a superblock, which is a physical area, as a zone, which is a logical area, the host 20 may recognize the available capacities of the superblocks as available capacities of the zones. Because the compression/decompression circuit 114 does not apply the same compression algorithm to the chunks at once, but selects and applies at least one of a plurality of compression algorithms, the compression algorithms of the compressed chunks may be the same or different. Accordingly, in an embodiment, because the host 20 does not predict the available capacities of the superblocks, the zone management circuit 112 may provide the same. The host 20 may periodically or aperiodically confirm the available capacities of the superblocks through the information, and transmit a write request to the storage device 100 based thereon. For example, in an embodiment, the host 20 may transmit a write request to the storage device 100 to preferentially use an available capacity of a target superblock (which is recognized by the host 20 as a target zone) of the current write operation. Through this, the efficiency of a zoned named space method in which data is sequentially written for each zone may be increased or maximized.

The storage device 100 according to an embodiment of the inventive concept may quickly access the compressed chunks respectively included in the superblocks by managing the location-related offset for each compressed chunk, and minimize or reduce a memory space utilized for conversion between the logical address and the physical address when accessing the compressed chunks.

In addition, the storage device 100 according to an embodiment of the inventive concept may provide the available capacities of superblocks to the host 20 so that the host 20 may be induce to make a write request, capable of increasing or maximizing the efficiency of the zoned namespace method, to the storage device 100.

Figure 3:
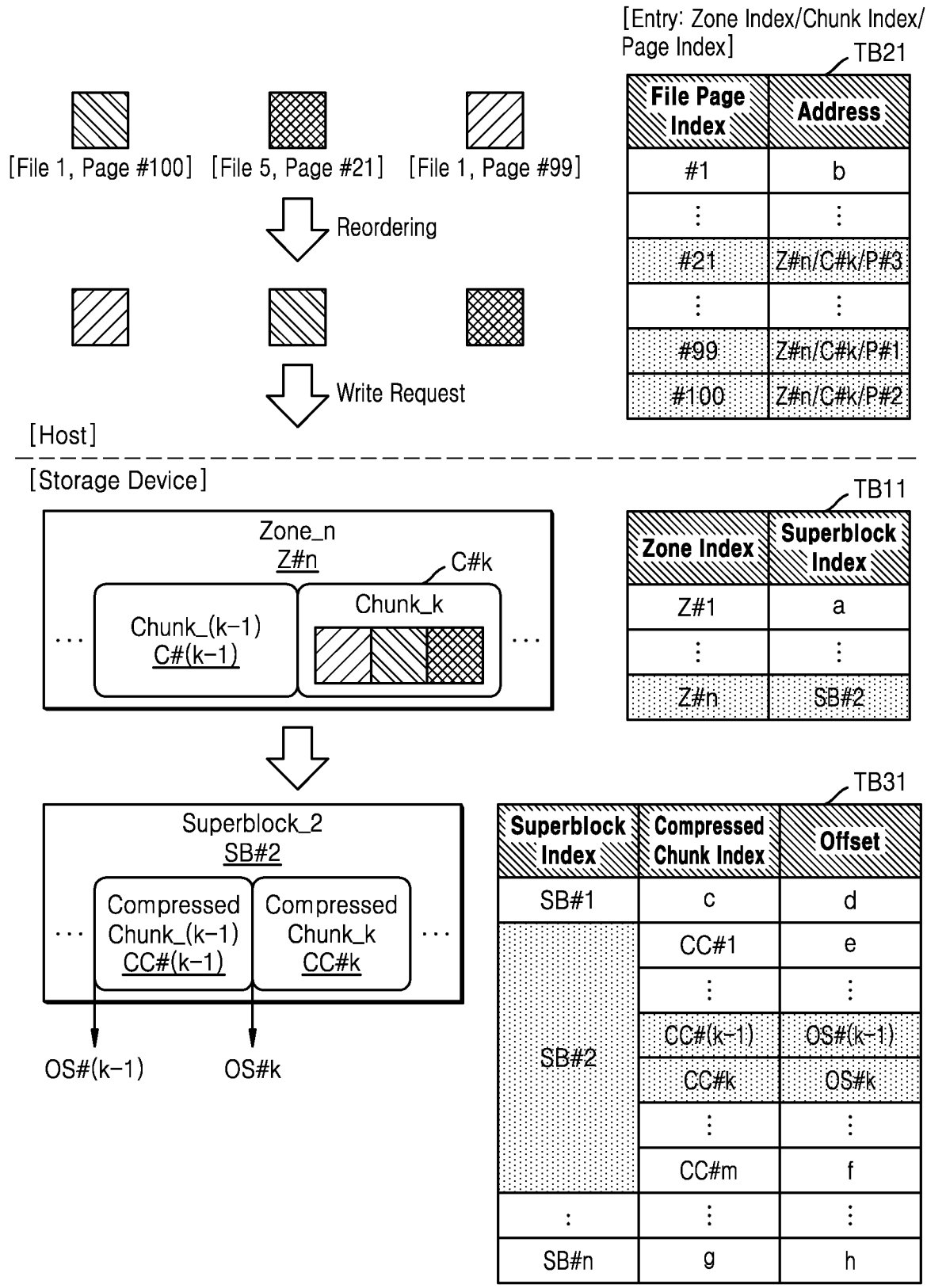
FIG. 3 is a diagram illustrating a series of operations of a data processing system according to an embodiment of the inventive concept.

FIG. 3 is a diagram illustrating a series of operations of a data processing system according to an embodiment of the inventive concept. The embodiment described below is merely an example and may be applied in various ways based on various implementations, and the inventive concept is not limited thereto.

Referring to FIG. 3, a host may store a 100th file page #100 of a first file File 1, a 21st file page #21 of a fifth file File 5, and a 99th file page #99 of a first file File 1 while executing a certain application program and performing a data processing operation. In the present specification, a file page may be data in a page unit used or processed by the host. In the present specification, a page may refer to a memory space in a page unit included in a chunk or a compressed chunk. The host may rearrange the 100th file page #100, the 21st file page #21, and the 99th file page #99 by considering a file index order and then considering a file page index order. As a result, the host may transmit the rearranged 99th file page #99, 100th file page #100, and 21st file page #21, a write request, and a logical address to a storage device. The write request in FIG. 3 may be referred to as a named write request, and may be a different type from that of a write request described below with reference to FIG. 8.

In an embodiment, the host may request a read operation performed on the storage device based on a first file mapping table TB21. The first file mapping table TB21 may indicate mapping relationships between indexes of file pages and logical addresses to which a plurality of file pages are written. In the present specification, data written to a specific address may be interpreted as data written to a memory area indicated by the specific address. An entry of a logical address may include a zone index, a chunk index, and a page index. The page index is for identifying pages included in the corresponding chunk. For example, in the first file mapping table TB21, the 21st file page #21 may have a logical address indicating that the 21st file page #21 is written to a third page P #3 of a k-th chunk C #k (where k is an integer greater than or equal to 1 or less than m) of the n-th zone Z #n, the 99th file page #99 may have a logical address indicating that the 99th file page #99 is written to a first page P #1 of the k-th chunk C #k of the n-th zone Z #n, and the 100th file page #100 may have a logical address indicating that the 100th file page #100 is written to a second page #2 of the k-th chunk C #k of the n-th zone Z #n.

In an embodiment, in response to a write request from the host, the storage device may sequentially write the 99th file page #99, the 100th file page #100, and the 21st file page #21 to the k-th chunk C #k of the n-th zone Z #n corresponding to the logical area. The storage device may compress the k-th chunk C #k to generate a k-th compressed chunk CC #k, and write the k-th compressed chunk CC #k to the second superblock SB #2 mapped to the n-th zone Z #n with reference to the zone mapping table TB11.

In an embodiment, the storage device may generate a k-th offset OS #k related to the location of the k-th compressed chunk CC #k in the second superblock SB #2, and update a compressed chunk mapping table TB31 based on the k-th offset OS #k. The storage device may use the compressed chunk mapping table TB31 to convert logical addresses into physical addresses. In an embodiment, the compressed chunk mapping table TB31 may indicate mapping relationships between indexes of superblocks, indexes of compressed chunks, and location-related offsets of the compressed chunks. For example, referring to the compressed chunk mapping table TB31, the k-th compressed chunk CC #k of the second superblock SB #2 may be mapped to the k-th offset OS #k. In addition, a k−1th compressed chunk CC #(k−1) of the second superblock SB #2 written before the k-th compressed chunk CC #k may be mapped a k−1th offset OS #(k−1).

In an embodiment, the k−1th offset OS #(k−1) may indicate a start physical address in the second superblock SB #2 of the k−1th compressed chunk CC #(k−1), and the k-th offset OS #k may indicate a start physical address in the second superblock SB #2 of the k-th compressed chunk CC #k. The storage device may find the k−1th compressed chunk CC #(k−1) and the k-th compressed chunk CC #k based on a relationship between the k−1th compressed chunk CC #(k−1) and the k-th compressed chunk CC #k, which are sequentially written in the second superblock SB #2, and the k−1th offset OS #(k−1) and the k-th offset OS #k. As described above, the storage device may find other compressed chunks in the second superblock SB #2, and may further find compressed chunks of other superblocks.

In an embodiment, the storage device may compress a received chunk in response to a write request from the host to generate a compressed chunk, write the compressed chunk to a superblock, and confirm a location-related offset of the compressed chunk to update the compressed chunk mapping table TB31. The storage device may convert a logical address received in response to a read request from the host into a physical address, based on the zone mapping table TB11 and the compressed chunk mapping table TB31. The storage device may perform the read operation using the physical address.

Various embodiments based on FIG. 3 are described below with reference to FIGS. 4 to 6.

Figure 4:
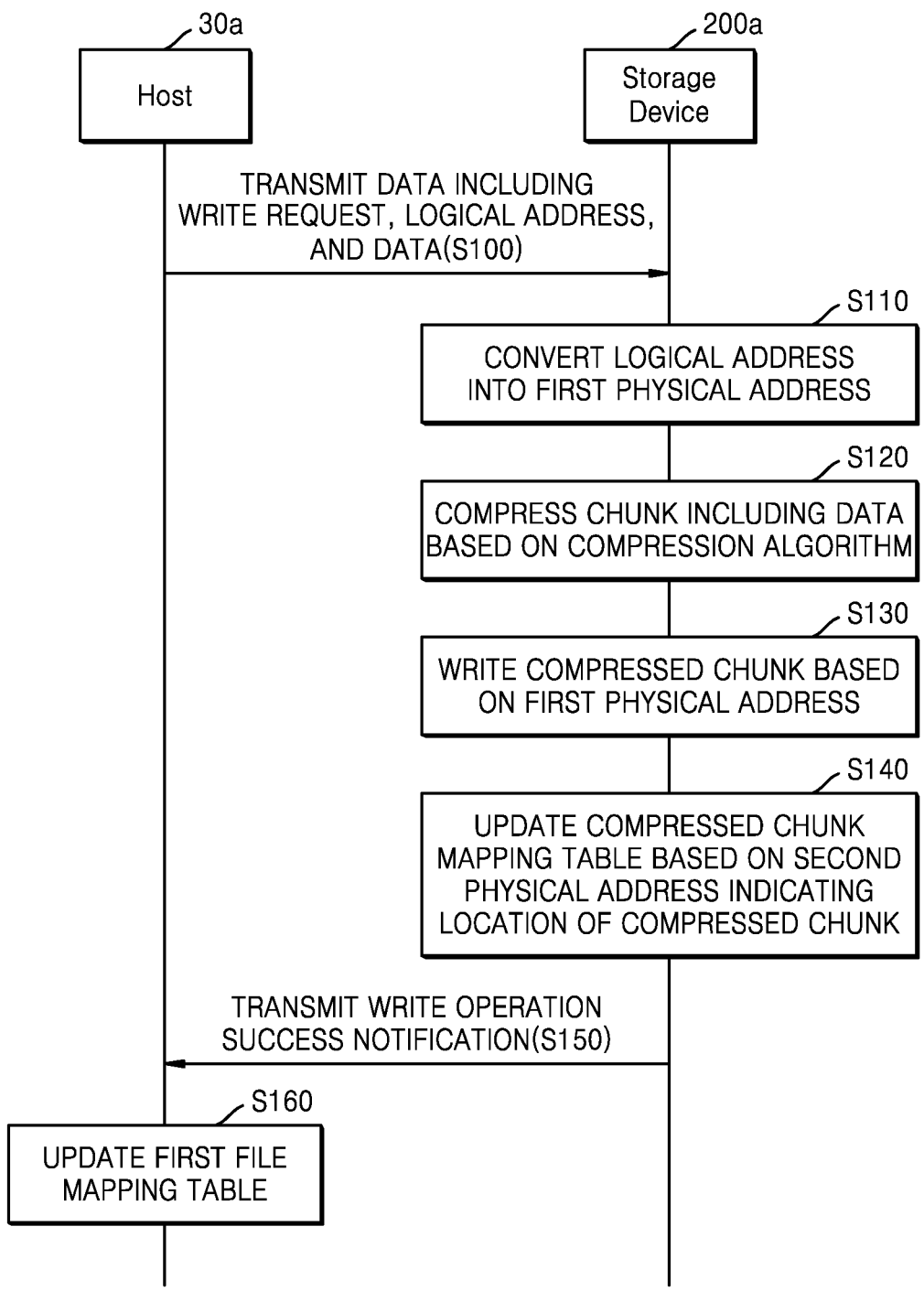
FIG. 4 is a flowchart illustrating an operating method of a data processing system according to an embodiment of the inventive concept.

FIG. 4 is a diagram illustrating an operating method of a data processing system according to an embodiment of the inventive concept. In FIG. 4, the data processing system may include a host 30*a* and a storage device 200*a*.

Referring to FIG. 4, in operation S100, the host 30*a* may transmit, to the storage device 200*a*, data including a write request, a logical address, and at least one file page. In an embodiment, the logical address is for designating a location where data is written, and may include a zone index, a chunk index, and a page index. In operation S110, the storage device 200*a* may convert the logical address received from the host 30*a* into a first physical address. The first physical address may include an index of a superblock and an index of a compressed chunk. In operation S120, the storage device 200*a* may compress the chunk including data, based on a compression algorithm. In an embodiment, the storage device 200*a* may select a compression algorithm most suitable for compressing the corresponding chunk from among a plurality of compression algorithms, and may use the selected algorithm to compress the corresponding chunk. In operation S130, the storage device 200*a* may write the compressed chunk to the superblock, based on the first physical address. In an embodiment, the storage device 200*a* may sequentially write the corresponding compressed chunk following an area in which a compressed chunk having an index closest to and lower than the index of the corresponding compressed chunk in the superblock indicated by the first physical address is written. Referring back to FIG. 3, the storage device 200a may write the k-th compression chunk CC #k next to the k−1th compressed chunk CC #(k−1) in the designated second superblock SB #2. In operation S140, the storage device 200a may update a compressed chunk mapping table based on the second physical address indicating the location of the compressed chunk in the superblock. Referring to FIG. 3, the storage device 200a may reflect the k-th offset OS #k of the k-th compressed chunk CC #k in the compressed chunk mapping table TB31. In an embodiment, the second physical address may be a start physical address of the compressed chunk in the superblock as a location-related offset of the above-described compressed chunk. In operation S150, the storage device 200a may transmit, to the host 30a, a write operation success notification in response to the write request.

In operation S160, the host 30a may update the first file mapping table based on the logical address and data in operation S100 for a read request of data written to the storage device 200a. However, this is only an embodiment, and the inventive concept is not limited thereto. For example, according to embodiments, the host 30a may update the first file mapping table in advance before performing operation S100.

Figure 5:
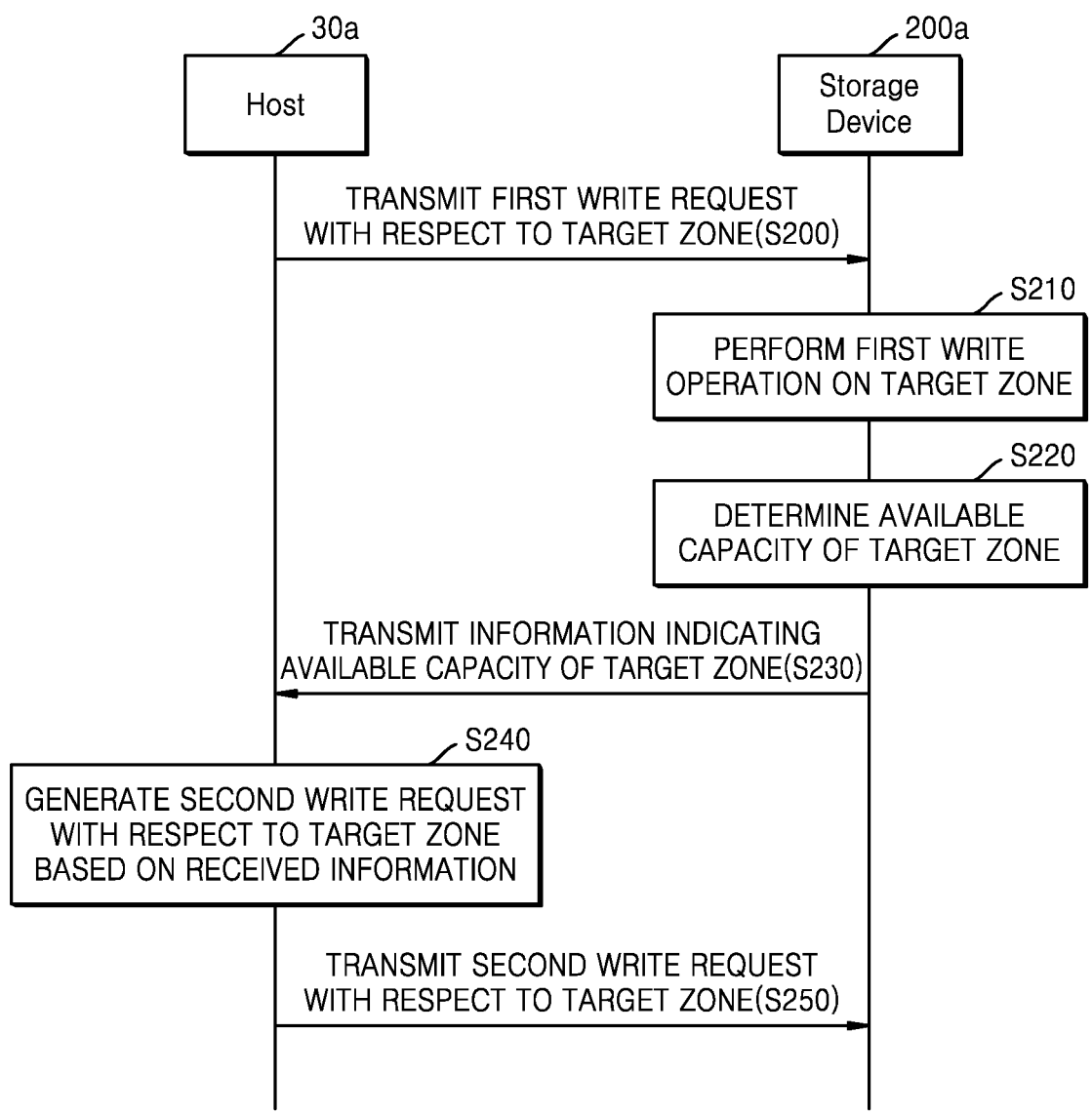
FIG. 5 is a flowchart illustrating an operating method of a data processing system according to an embodiment of the inventive concept.

FIG. 5 is a flowchart illustrating an operating method of a data processing system according to an embodiment of the inventive concept. In FIG. 5, the data processing system may include the host 30a and the storage device 200a. Hereinafter, an embodiment relating to a target zone recognized by the host 30a is mainly described.

Referring to FIG. 5, in operation S200, the host 30a may transmit a first write request for the target zone to the storage device 200a. In operation S210, the storage device 200a may perform a first write operation on the target zone. For example, the storage device 200a may perform the first write operation on a superblock mapped to the target zone. In operation S220, the storage device 200a may confirm an available capacity of the target zone. For example, the storage device 200a may confirm the remaining memory capacity of the superblock after completing the first write operation on the superblock mapped to the target zone as the available capacity. In operation S230, the storage device 200a may transmit information indicating the available capacity of the target zone. For example, the storage device 200a may transmit, to the host 30a, information indicating the available capacity of the superblock mapped to the target zone. In operation S240, the host 30a may generate a second write request for the target zone based on the received information. For example, in an embodiment, the host 30a may generate a second write request for data to be written to the storage device 200a following the data for which the first write request is performed in operation S200 so as to preferentially use the available capacity of the target zone with reference to the information received in operation S230. In some embodiments, when the available capacity of the target zone is insufficient or there is no available capacity of the target zone, the host 30a may generate the second write request so that the corresponding data is written to a next target zone. In operation S250, the host 30a may transmit the second write request for the target zone.

Figure 6:
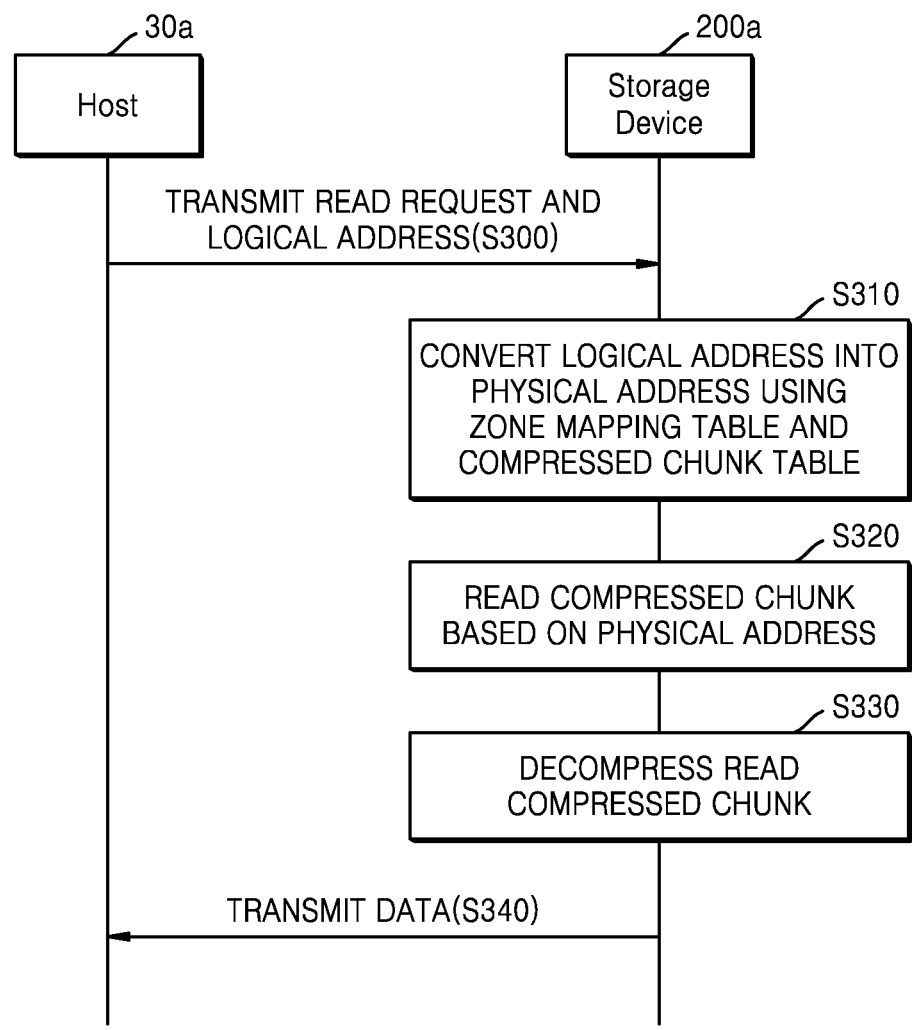
FIG. 6 is a flowchart illustrating an operating method of a data processing system according to an embodiment of the inventive concept.

FIG. 6 is a flowchart illustrating an operating method of a data processing system according to an embodiment of the inventive concept. In FIG. 6, the data processing system may include the host 30a and the storage device 200a. Hereinafter, an embodiment in which the storage device 200a performs a read operation in response to a read request from the host 30a is described.

Referring to FIG. 6, in operation S300, the host 30a may transmit the read request for requested data and a logical address to the storage device 200a. For example, the host 30a may obtain the logical address of the requested data with reference to the file mapping table TB21 of FIG. 3. In an embodiment, the logical address may include a zone index, a chunk index, and page indexes. In the present specification, page indexes are for identifying pages included in a chunk, and may be referred to as indexes of pages. In operation S310, the storage device 200a may convert the logical address received from the host 30a into a physical address by using a zone mapping table and a compressed chunk table. In operation S320, the storage device may read the compressed chunk based on the physical address. For example, the storage device 200a may find a superblock mapped to the zone index of the logical address with reference to the zone mapping table, and find a compressed chunk mapped to the chunk index of the logical address in the corresponding superblock with reference to the compressed chunk mapping table. In operation S330, the storage device 200a may generate a chunk by decompressing the read compressed chunk. In operation S340, the storage device 200a may transmit, to the host 30a, data written to pages respectively corresponding to page indexes of logical addresses in the generated chunk.

Figure 7A:
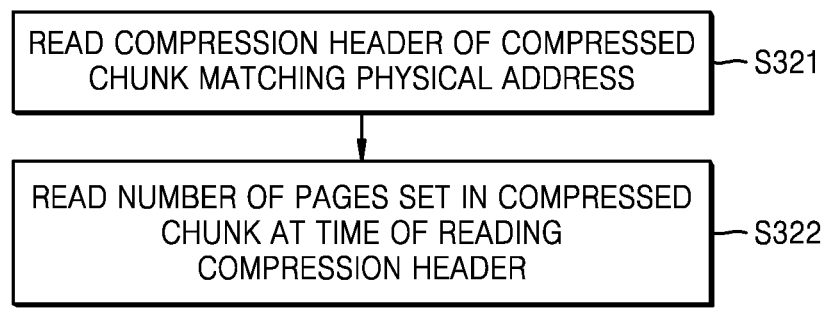
FIG. 7A is a flowchart illustrating an operation of a storage device in operation S320 of FIG. 6 according to an embodiment of the inventive concept.
Figure 7B:
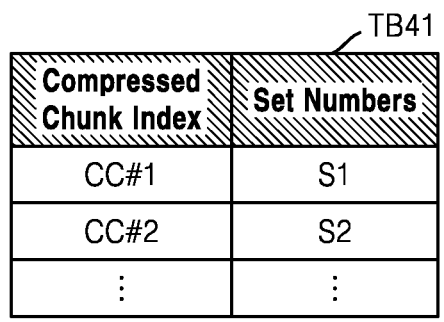
FIG. 7B is a table diagram illustrating operation references of the storage device of FIG. 7A according to an embodiment of the inventive concept.

FIG. 7A is a flowchart illustrating an operation of the storage device 200a in operation S320 of FIG. 6 according to an embodiment of the inventive concept. FIG. 7B is a table diagram illustrating operation references of the storage device 200a of FIG. 7A according to an embodiment of the inventive concept. Operations S321 and S322 of FIG. 7A may be included in operation S320 of FIG. 6.

Referring to FIG. 7A, in operation S321, the storage device 200a may read a compression header of a compressed chunk matching a physical address. For example, in an embodiment, the storage device 200a may preferentially read the compression header to obtain information about a compression algorithm utilized for decompressing the compressed chunk. In operation S322, the storage device 200a may additionally read more pages by the number of pages set in the compressed chunk than the number of pages requested by the host 30a to be read at the time of reading the compression header. In the present specification, an operation in which the storage device 200a additionally reads more pages by the number of pages set in the compressed chunk than the number of pages requested by the host 30a to be read may be referred to as a prefetch operation. The storage device 200a may prefetch data that is expected to be read in order to reduce or minimize a memory access wait time. Because a compression algorithm, a size, etc. may be different for each compressed chunk, the number of pages set for prefetch may be set differently for each compressed chunk.

Referring to FIG. 7B, a table TB41 may indicate the number of pages set for prefetch for each compressed chunk index. For example, a first number of pages S1 may be set in the first compressed chunk CC #1, and a second number of pages S2 may be set in the second compressed chunk CC #2. The storage device 200a may update the table TB41 considering the compression algorithm and size of the compressed chunk.

Figure 8:
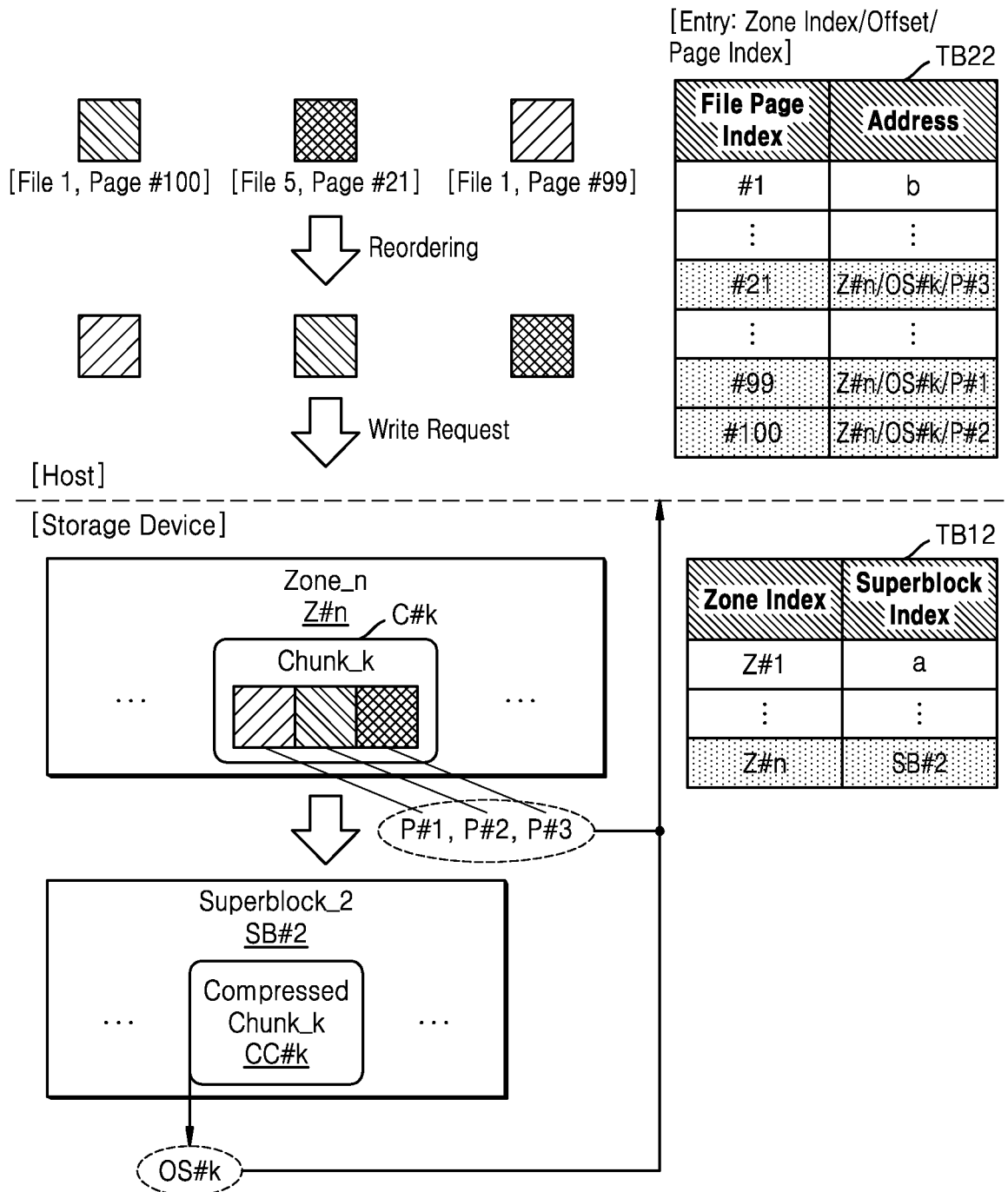
FIG. 8 is a diagram illustrating a series of operations of a data processing system according to an embodiment of the inventive concept.

FIG. 8 is a diagram illustrating a series of operations of a data processing system according to an embodiment of the inventive concept. The embodiment described below is merely an example and may be applied in various ways based on various implementations, and the inventive concept is not limited thereto.

Referring to FIG. 8, a host may store a 100th file page #100 of a first file File 1, a 21st file page #21 of a fifth file File 5, and a 99th file page #99 of a first file File 1 while executing a certain application program and performing a data processing operation. The host may rearrange the 100th file page #100, the 21st file page #21, and the 99th file page #99 by considering a file index order and then considering a file page index order. The host may transmit the rearranged 99th file page #99, 100th file page #100, and 21st file page #21, a write request, and a logical address to a storage device. The write request in FIG. 8 may be referred to as a nameless write request or a zone append command. Unlike the logical address of FIG. 3 including a zone index, a chunk index, and a page index, the logical address of FIG. 8 may include only a zone index. That is, the host may indicate only a zone in which data including the rearranged 99th file page #99, 100th file page #100, and 21st file page #21 is written.

In an embodiment, in response to the write request from the host, the storage device may use the zone mapping table TB12 to find the n-th zone Z #n matching the logical address, randomly select the k-th chunk C #k and pages P #1, P #2, and P #3 included in the k-th chunk C #k from among a plurality of chunks of the n-th zone Z #n, and sequentially write the 99th file page #99, the 100th file page #100, and the 21st file page #21 to the k-th chunk C #k. The storage device may compress the k-th chunk C #k to generate a k-th compressed chunk CC #k, and write the k-th compressed chunk CC #k to the second superblock SB #2 mapped to the n-th zone Z #n with reference to the zone mapping table TB12.

In an embodiment, the storage device may generate the k-th offset OS #k related to the location of the k-th compressed chunk CC #k in the second superblock SB #2. The storage device may write the k-th compressed chunk CC #k to the second superblock SB #2, and then transmit, to the host, address information including the index of the n-th zone Z #n, the k-th offset OS #k, and indexes of the first to third pages P #1, P #2, and P #3. In some embodiments, the storage device may transmit, to the host, the address information including the k-th offset OS #k, and the indexes of the first to third pages P #1, P #2, and P #3, excluding the index of the n-th zone Z #n.

In an embodiment, the host may update the second file mapping table TB22 based on address information received from the storage device. The second file mapping table TB22 may indicate mapping relationships between indexes of file pages and logical addresses to which a plurality of file pages are written. An entry of a logical address may include a zone index, a location-related offset of the compressed chunk, and a page index. On the other hand, because the host has not determined that the compression/decompression operation is performed in the storage device, and the index of the compressed chunk may be the same as the index of the chunk, the host may recognize the location-related offset of the compressed chunk as the location-related offset of the chunk. For example, the host may update the second file mapping table TB22 to indicate that the 21st file page #21 is written to the third page P #3 of a chunk corresponding to a compressed chunk having the k-th offset OS #k of the n-th zone Z #n, the 99th file page #99 is written to the first page P #1 of the chunk corresponding to the compressed chunk having the k-th offset OS #k of the n-th zone Z #n, and the 100th file page #100 is written to the second page #2 of the chunk corresponding to the compressed chunk having the k-th offset OS #k of the n-th zone Z #n, based on the address information. The host may request a read operation with respect to the storage device based on the second file mapping table TB22.

In an embodiment, the storage device may convert the received logical address into a physical address based on the zone mapping table TB12, in response to a read request from the host. The storage device may perform the read operation using the physical address.

In an embodiment according to FIG. 8, unlike FIG. 3, the host side may manage location-related offsets of compressed chunks by using the second file mapping table TB22. Various embodiments based on FIG. 8 are described below with reference to FIGS. 9 and 10.

Figure 9:
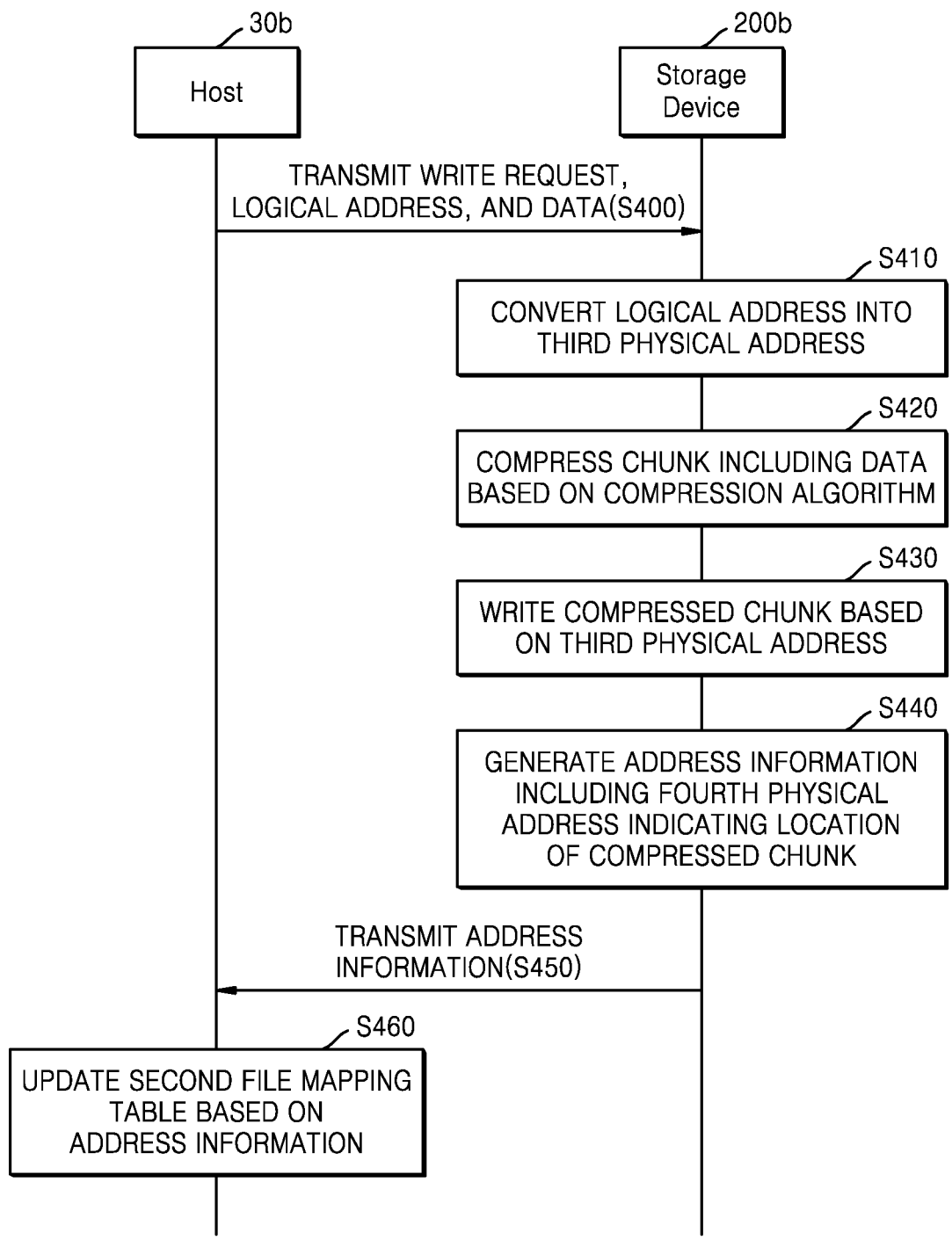
FIG. 9 is a flowchart illustrating an operating method of a data processing system according to an embodiment of the inventive concept.

FIG. 9 is a flowchart illustrating an operating method of a data processing system according to an embodiment of the inventive concept. In FIG. 9, the data processing system may include a host 30b and a storage device 200b.

Referring to FIG. 9, in operation S400, the host 30b may transmit, to the storage device 200b, data including a write request, a logical address, and at least one file page. In an embodiment, the logical address may designate a location where data is written, and may include a zone index. Moreover, the storage device 200b may designate the remaining locations where data is written, and notify the host 30b of the locations where data is written. In operation S410, the storage device 200b may convert the logical address received from the host 30b into a third physical address by using a zone mapping table. In an embodiment, the third physical address may include a zone index included in the logical address and an index of a mapped superblock. In operation S420, the storage device 200b may compress the chunk including data, based on a compression algorithm. In an embodiment, the storage device 200b may select a compression algorithm most suitable for compressing the corresponding chunk from among a plurality of compression algorithms, and use the selected compression algorithm to compress the corresponding chunk. In operation S430, the storage device 200b may write the compressed chunk to the superblock, based on the third physical address.

In an embodiment, the storage device 200b may determine an index of the compressed chunk, and may determine indexes of pages in which data received in a chunk corresponding to the corresponding compressed chunk is written. The storage device 200b may sequentially write the corresponding compressed chunk following an area in which a compressed chunk having an index closest to and lower than the index of the corresponding compressed chunk in the superblock corresponding to the third physical address is written. In operation S440, the storage device 200b may generate address information including a fourth physical address indicating a location of the corresponding compressed chunk in the superblock. In an embodiment, the fourth physical address may include an offset of the corresponding compressed chunk and indexes of pages of the chunk corresponding to the compressed chunk. In some embodiments, the fourth physical address may further include an index of a zone mapped to the superblock in which the corresponding compressed chunk is written. In operation S450, the storage device 200b may transmit the address information to the host 30b. In operation S460, the host 30b may update a second file mapping table based on the address information. In an embodiment, the host 30b may reflect the address information in the second file mapping table to indicate an area in the storage device 200b to which the data in operation S400 is written.

Figure 10:
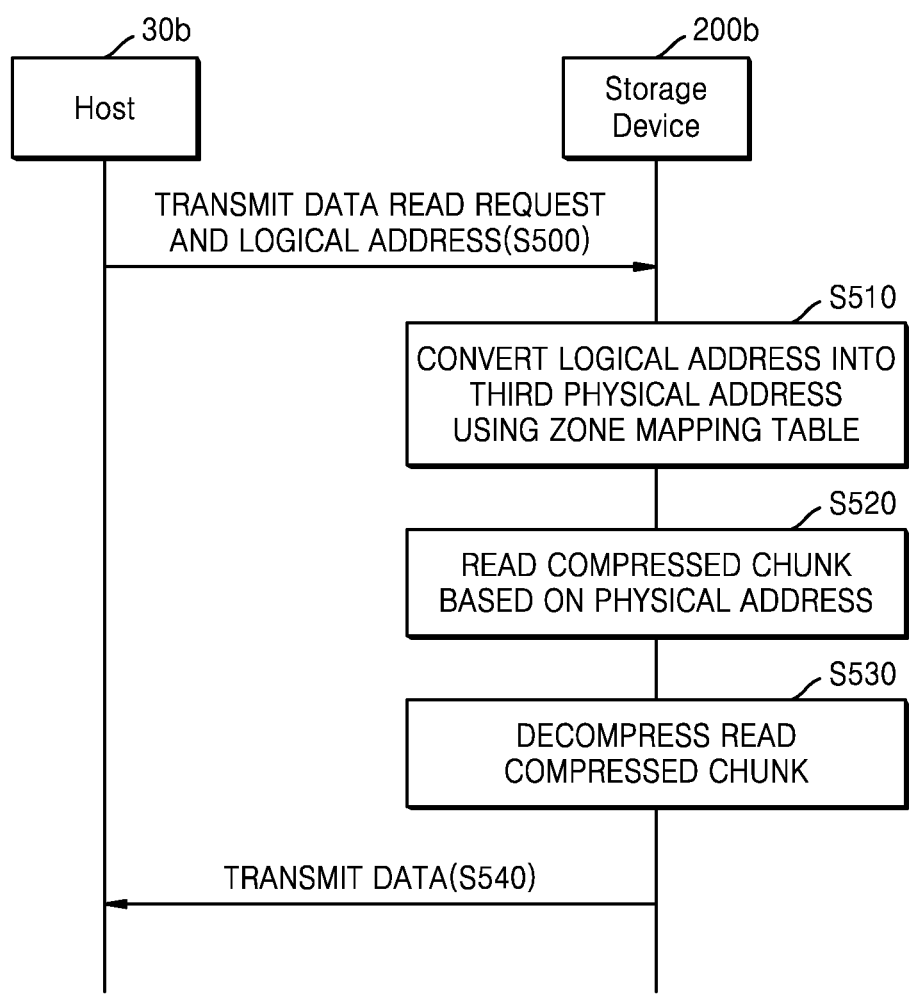
FIG. 10 is a flowchart illustrating an operating method of a data processing system according to an embodiment of the inventive concept.

FIG. 10 is a flowchart illustrating an operating method of a data processing system according to an embodiment of the inventive concept. In FIG. 10, the data processing system may include a host 30b and a storage device 200b. Hereinafter, an embodiment in which the storage device 200b performs a read operation in response to a read request from the host 30b will be described.

Referring to FIG. 10, in operation S500, the host 30b may transmit, to the storage device 200b, a read request for requested data and a logical address. For example, the host 30b may obtain the logical address of the requested data with reference to the file mapping table TB22 of FIG. 8. In an embodiment, the logical address may include a zone index, an offset of a compressed chunk, and page indexes. The page indexes may indicate pages in which data utilized by the host 30b is written among pages included in a chunk generated by decompressing the corresponding compressed chunk. In operation S510, the storage device 200b may convert the logical address into a physical address by using a zone mapping table. In an embodiment, the storage device 200b may convert a zone index of the corresponding logical address into an index of a superblock mapped thereto with reference to the zone mapping table. In an embodiment, the physical address may include the index of the superblock and the offset of the compressed chunk. In operation S520, the storage device 200b may read the compressed chunk based on the physical address. In operation S530, the storage device 200b may decompress the read compressed chunk. In an embodiment, the storage device 200b may confirm a compression algorithm from a compression header of the compressed chunk, and decompress the compressed chunk based on the confirmed compression algorithm. In operation S540, the storage device 200b may transmit, to the host 30b, the data written to pages corresponding to the page indexes of the logical address in the chunk generated by decompressing the compressed chunk.

Figure 11A:
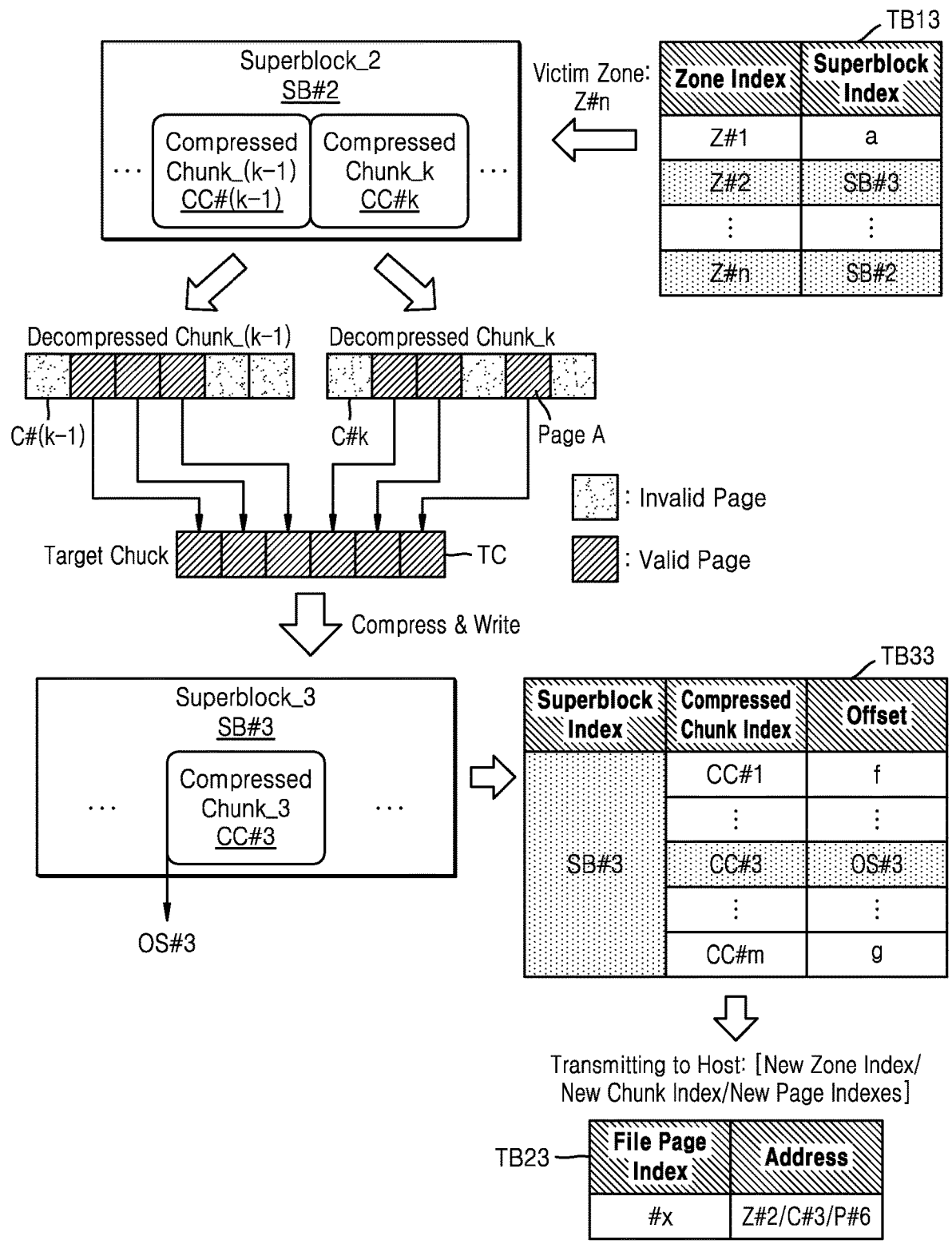
FIGS. 11A and 11B are diagrams illustrating garbage collection operations of a storage device according to an embodiment of the inventive concept.
Figure 11B:
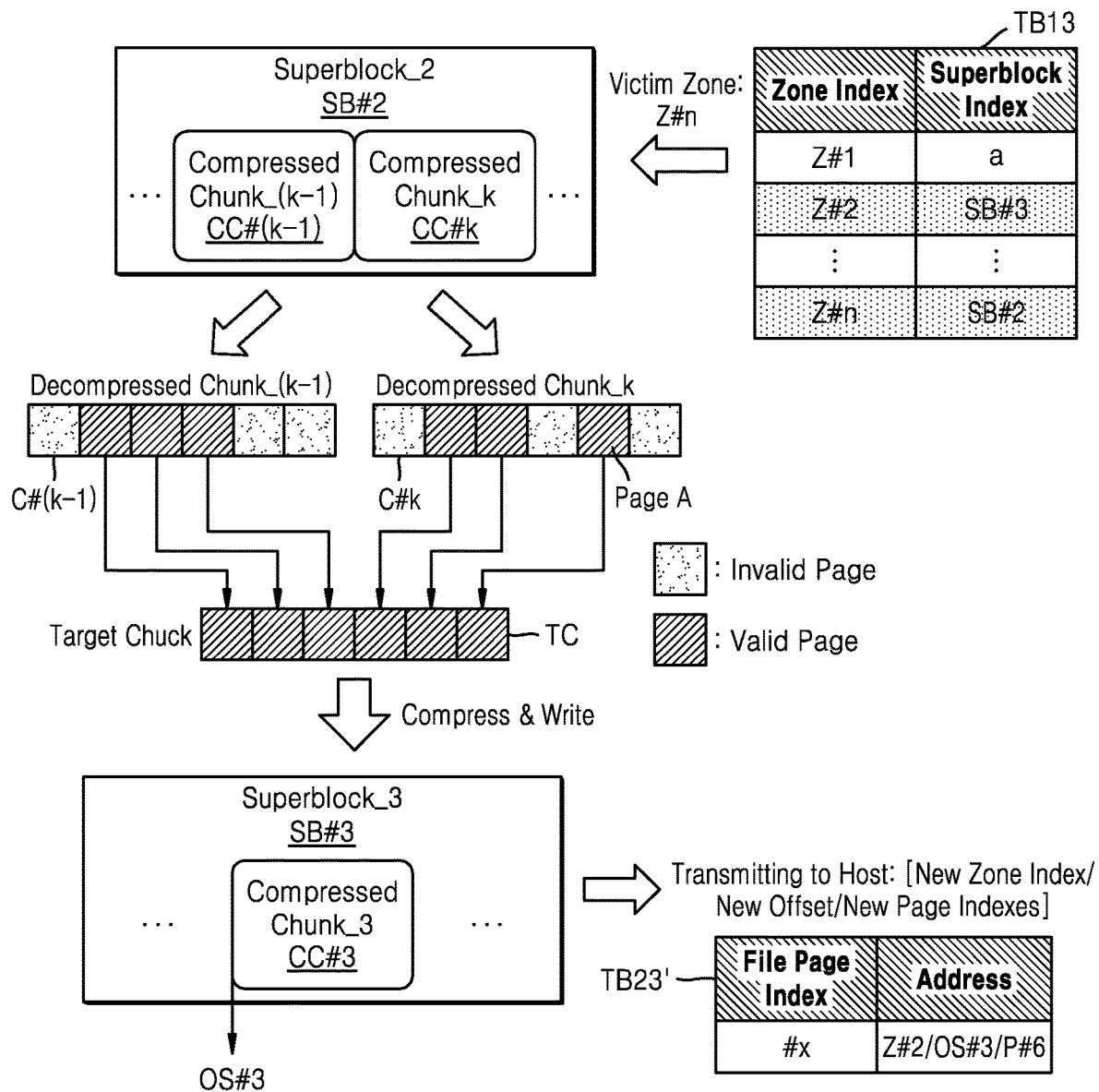

FIGS. 11A and 11B are diagrams illustrating garbage collection operations of a storage device according to an embodiment of the inventive concept. The garbage collection operation according to an embodiment of FIG. 3 is described with reference to FIG. 11A, and the garbage collection operation according to an embodiment of FIG. 8 is described with reference to FIG. 11B.

Referring to FIG. 11A, the storage device may receive valid page information for each chunk (the storage device recognizes valid page information for each compressed chunk) and information about a selected victim zone from a host. For example, the victim zone corresponds to the n-th zone Z #n, and the storage device may perform garbage collection on the second superblock SB #2 corresponding to the n-th zone Z #n, based on the valid page information for each chunk received from the host. For example, the storage device may decompress the k−1th compressed chunk CC #(k−1) and the k-th compressed chunk CC #k to generate the k−1th chunk C #(k−1) and the k-th chunk C #k, respectively, and write (or copy) valid pages among pages of the k−1th chunk C #(k−1) and pages of the k-th chunk C #k to a chunk buffer as a target chunk TC. The storage device may write a target compressed chunk generated by compressing the target chunk TC to the third superblock SB #3 as a third compressed chunk CC #3. For example, the third superblock SB #3, to which the target chunk TC is compressed and written, may be determined by the storage device or the host. The storage device may update a compressed chunk mapping table TB33 based on a result of garbage collection. For example, the storage device may reflect a third offset OS #3 of the third compressed chunk CC #3 of the third superblock SB #3 in the compressed chunk mapping table TB33 so as to indicate an area to which the target chunk TC including the valid pages is compressed and written. To notify the host of the result of garbage collection, the storage device may transmit garbage collection result information including a new zone index, a new chunk index, and new page indexes with respect to the target chunk TC to the host. For example, when page A included in the k-th chunk C #k is an x-th file page #x, and is written to a sixth page of the target chunk TC, the host may update a logical address of the x-th file page #x of the first file mapping table TB23 based on the garbage collection result information. For example, the host may update the first file mapping table TB23 to indicate that the x-th file page #x is written to the sixth page P #6 of the third chunk C #3 corresponding to the third compressed chunk CC #3 in the second zone Z #2 mapped to the third superblock SB #3, based on the garbage collection result information.

Referring to FIG. 11B, unlike in FIG. 11A, the storage device does not manage the compressed chunk mapping table, and may transmit the garbage collection result information to the host so that the host may manage offsets of the compressed chunks through a second file mapping table TB23'. In an embodiment, the storage device may transmit, to the host, the garbage collection result information including a new zone index, an offset of a new compressed chunk, and new page indexes with respect to the target chunk to notify the host of the result of the garbage collection. For example, when the page A included in the k-th chunk C #k is the x-th file page #x, and is written to a sixth page of the target chunk TC, the host may update the logical address with respect to the x-th file page #x of the second file mapping table TB23', based on the garbage collection result information. For example, the host may update the first file mapping table TB23' to the second zone Z #2 indicating a location of the storage device to which the x-th file page #x is written, the third offset OS #3 of the third compressed chunk CC #3, and the sixth page P #6, based on the garbage collection result information.

Figure 12:
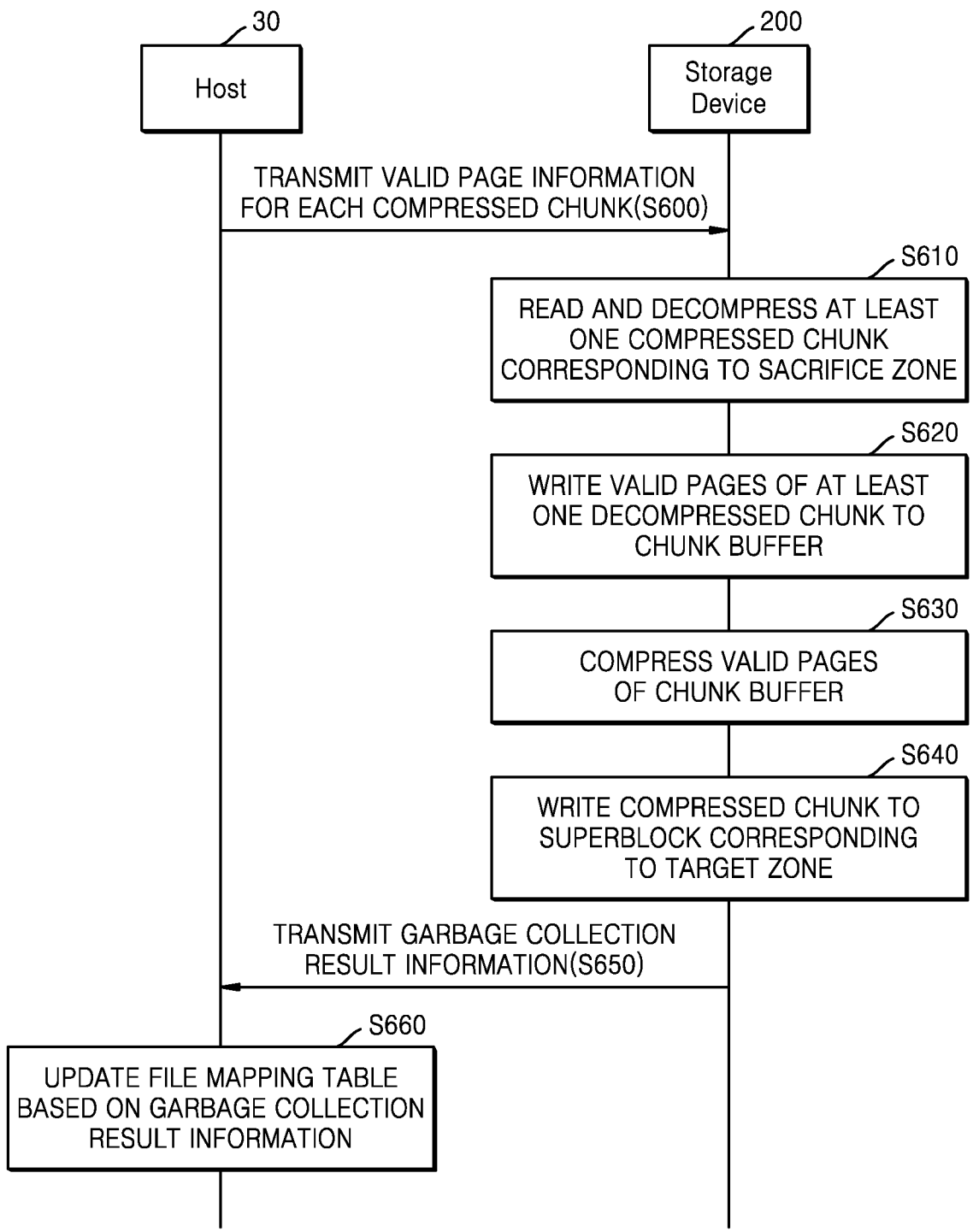
FIG. 12 is a flowchart illustrating a garbage collection operation method of a data processing system according to an embodiment of the inventive concept.

FIG. 12 is a flowchart illustrating a garbage collection operation method of a data processing system according to an embodiment of the inventive concept. In FIG. 12, the data processing system may include a host 30 and a storage device 200.

Referring to FIG. 12, in operation S600, the host 30 may transmit valid page information for each compressed chunk to the storage device 200. In operation S610, the storage device 200 may read and decompress at least one compressed chunk corresponding to a victim zone. In operation S620, the storage device 200 may write valid pages of at least one decompressed chunk to a chunk buffer, based on the valid page information for each compressed chunk. In operation S630, the storage device 200 may compress the valid pages of the chunk buffer. In operation S640, the storage device 200 may write the compressed chunk to a superblock corresponding to a target zone. In operation S650, the storage device 200 may transmit, to the host 30, garbage collection result information according to operations S610 to S640. In operation S660, the host 30 may update a file mapping table based on the garbage collection result information.

Figure 13A:
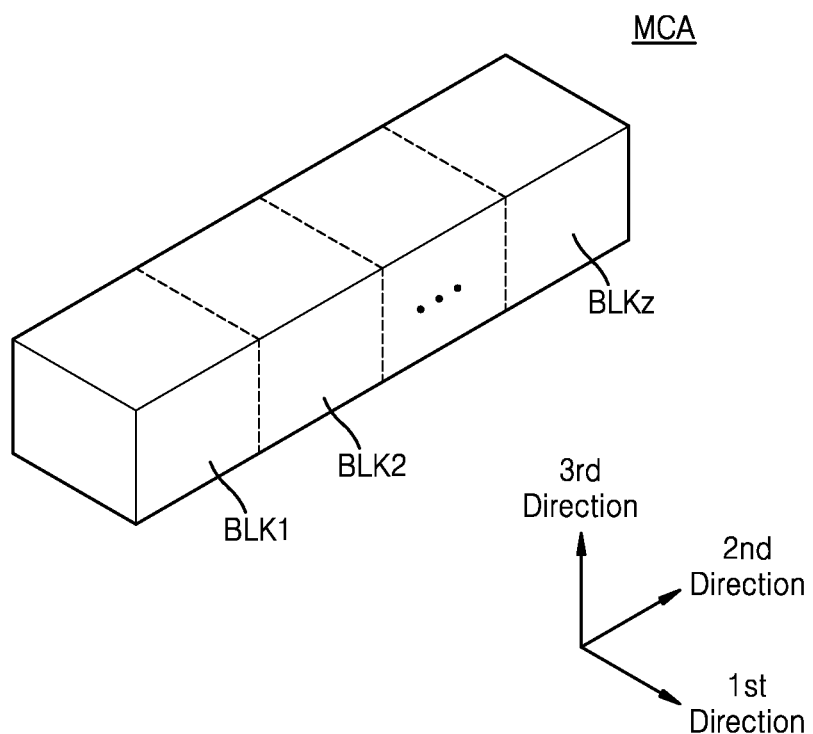
FIG. 13A is a diagram illustrating a memory cell array (MCA) of a memory device of FIG. 1 according to an embodiment of the inventive concept.
Figure 13B:
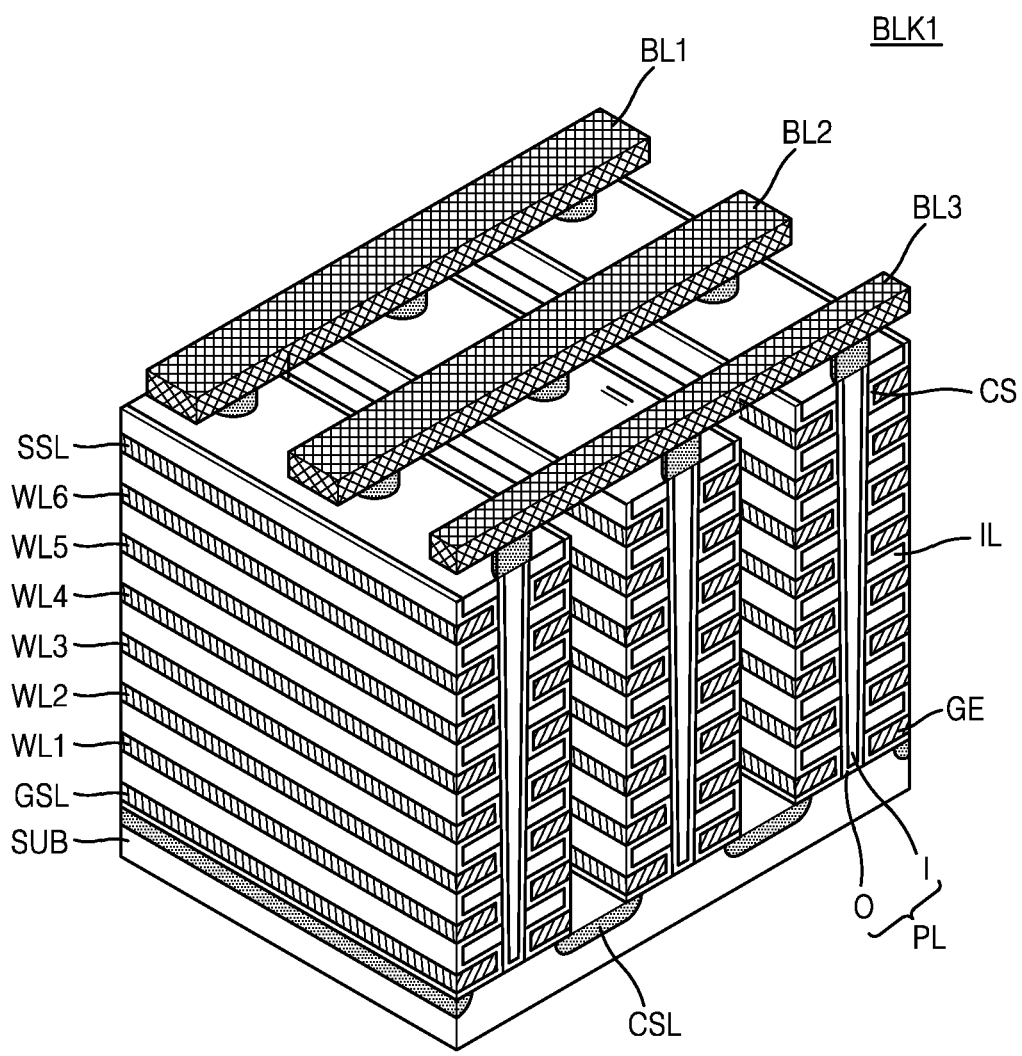
FIG. 13B is a diagram illustrating a configuration of a block among memory blocks of FIG. 13A according to an embodiment of the inventive concept.

FIG. 13A is a diagram illustrating a memory cell array (MCA) of the memory device 120 of FIG. 1 according to an embodiment of the inventive concept. FIG. 13B is a diagram illustrating a configuration of a block BLK1 among a plurality of memory blocks BLK1 to BLKz of FIG. 13A according to an embodiment of the inventive concept.

Referring to FIG. 13A, the MCA may include the plurality of memory blocks BLK1 to BLKz. Each of the memory blocks BLK1 to BLKz may have a three-dimensional structure (or a vertical structure). For example, each of the memory blocks BLK1 to BLKz may include structures extending in first to third directions. Each of the memory blocks BLK1 to BLKz may include a plurality of cell strings extending in the second direction. The plurality of cell strings may be spaced apart from each other in the first and third directions. The cell strings of one memory block are connected to a plurality of bit lines BL, a plurality of string selection lines SSL, a plurality of word lines WL, a single ground selection line or a plurality of ground selection lines GSL, and a common source line. The cell strings of the plurality of memory blocks BLK1 to BLKz may share the plurality of bit lines BL. For example, the plurality of bit lines BL may extend in the second direction and may be shared by the plurality of memory blocks BLK1 to BLKz.

Referring to FIG. 13B, one memory block BLKn among the plurality of memory blocks BLK1 to BLKz of FIG. 13A is formed in a vertical direction with respect to a substrate SUB. The common source line CSL is disposed on the substrate SUB, and gate electrodes GE and an insulation layer IL are alternately stacked on the substrate SUB. Also, a charge storage layer CS may be formed between the gate electrode GE and the insulating layer IL.

When the plurality of gate electrodes GE and the insulating layers IL that are alternately stacked are vertically patterned, a V-shaped pillar PL is formed. The pillar PL passes through the gate electrodes GE and the insulating layers IL to be connected to the substrate SUB. An outer portion O of the pillar PL may include a semiconductor material and function as a channel, and an inner portion I of the pillar PL may include an insulating material, such as, for example, silicon oxide.

The gate electrodes GE of the memory block BLKn may be respectively connected to the ground selection line GSL, a plurality of word lines WL1 to WL6, and the string selection line SSL. In addition, the pillar PL of the memory block BLKn may be connected to the plurality of bit lines BL1 to BL3.

It is to be understood that the memory block BLKn illustrated in FIG. 13B is merely an embodiment provided as an example, and the inventive concept is not limited thereto. For example, embodiments of the inventive concept may be applied to various implementations (including a two-dimensional memory structure) of the memory block BLKn.

Figure 14:
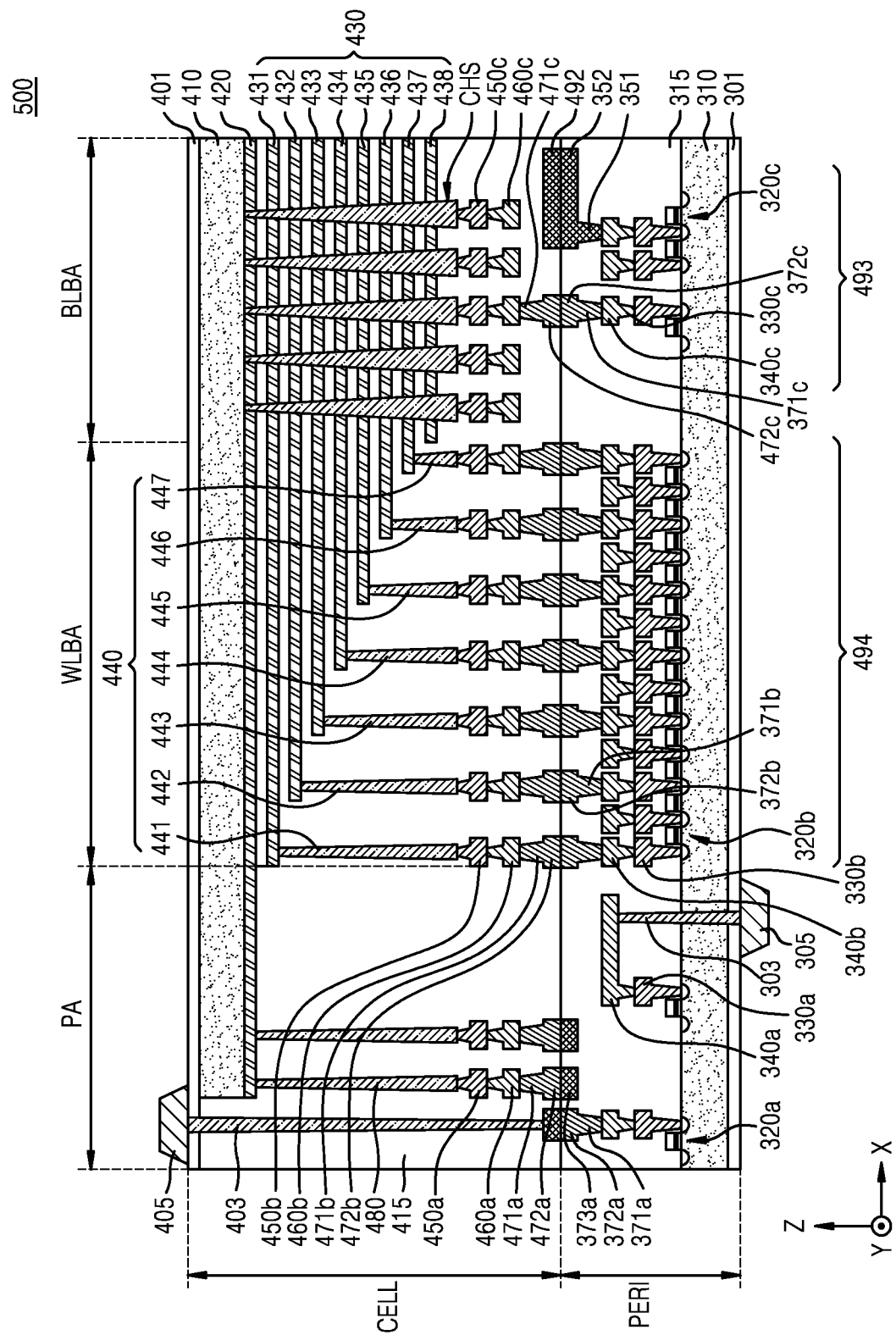
FIG. 14 is a diagram illustrating a chip-to-chip (C2C) structure applied to a memory device according to an embodiment of the inventive concept.

FIG. 14 is a diagram illustrating a chip-to-chip (C2C) structure applied to a memory device 500 according to an embodiment of the inventive concept. The memory device 500 is an embodiment of the memory device 120 of FIG. 1.

Referring to FIG. 14, the memory device 500 may have the C2C structure. The C2C structure may mean manufacturing an upper chip including a cell area CELL on a first wafer, manufacturing a lower chip including a peripheral circuit area PERI on a second wafer different from the first wafer, and then connecting the upper chip and the lower chip to each other by using a bonding method. For example, the bonding method may refer to a method of electrically connecting a bonding metal formed on the uppermost metal layer of the upper chip and a bonding metal formed on the uppermost metal layer of the lower chip to each other. For example, when the bonding metal is formed of copper (Cu), the bonding method may be a Cu—Cu bonding method, and the bonding metal may be formed of aluminum or tungsten.

Each of the peripheral circuit area PERI and the cell area CELL of the memory device 500 may include an external pad bonding area PA, a word line bonding area WLBA, and a bit line bonding area BLBA.

The peripheral circuit area PERI may include a first substrate 310, an interlayer insulating layer 315, a plurality of circuit elements 320a, 320b, and 320c formed on the first substrate 310, first metal layers 330a, 330b, and 330c respectively connected to the plurality of circuit elements 320a, 320b, and 320c, and second metal layers 340a, 340b, and 340c respectively formed on the first metal layers 330a, 330b, and 330c. In an embodiment, the first metal layers 330a, 330b, and 330c may be formed of tungsten having a relatively high resistance, and the second metal layers 340a, 340b, and 340c may be formed of copper having a relatively low resistance.

In the present specification, only the first metal layers 330a, 330b, and 330c and the second metal layers 340a, 340b, and 340c are shown and described, but the inventive concept is not limited thereto. For example, according to embodiments, at least one or more metal layers may be further formed and included with the second metal layers 340a, 340b, and 340c. At least some of the one or more metal layers formed on the second metal layers 340a, 340b, and 340c may be formed of aluminum having a lower resistance than that of copper forming the second metal layers 340a, 340b, and 340c.

The interlayer insulating layer 315 may be disposed on the first substrate 310 to cover the plurality of circuit elements 320a, 320b, and 320c, the first metal layers 330a, 330b, and 330c, and the second metal layers 340a, 340b, and 340c, and may include an insulating material, such as, for example, silicon oxide, silicon nitride, etc.

Lower bonding metals 371b and 372b may be formed on the second metal layer 340b of the word line bonding area WLBA. In the word line bonding area WLBA, the lower bonding metals 371b and 372b of the peripheral circuit area PERI may be electrically connected to the upper bonding metals 471b and 472b of the cell area CELL by using a bonding method. The lower bonding metals 371b and 372b and the upper bonding metals 471b and 472b may be formed of, for example, aluminum, copper, tungsten, etc.

The cell area CELL may provide at least one memory block. The cell area CELL may include a second substrate 410 and a common source line 420. On the second substrate 410, a plurality of word lines 430 (including word lines 431 to 438) may be stacked in a direction (Z-axis direction) substantially perpendicular to an upper surface of the second substrate 410. String selection lines and ground selection lines may be disposed on upper and lower portions of the word lines 430, respectively, and the plurality of word lines 430 may be disposed between the string selection lines and the ground selection line.

In the bit line bonding area BLBA, the channel structure CH may extend in the direction substantially perpendicular to the upper surface of the second substrate 410 to pass through the word lines 430, the string selection lines, and the ground selection line. The channel structure CH may include a data storage layer, a channel layer, and a buried insulating layer, and the channel layer may be electrically connected to the first metal layer 450c and the second metal layer 460c. For example, the first metal layer 450c may be a bit line contact, and the second metal layer 460c may be a bit line. In an embodiment, the bit line 460c may extend in a first direction (Y-axis direction) substantially parallel to the upper surface of the second substrate 410.

In an embodiment as shown in FIG. 14, an area in which the channel structure CH and the bit line 460c are disposed may be defined as the bit line bonding area BLBA. The bit line 460c may be electrically connected to the circuit elements 320c providing the page buffer 493 in the peripheral circuit area PERI in the bit line bonding area BLBA. For example, the bit line 460c may be connected to the upper bonding metals 471c and 472c in the peripheral circuit area PERI, and the upper bonding metals 471c and 472c may be connected to the lower bonding metals 371c and 372c connected to the circuit elements 320c of the page buffer 493.

In the word line bonding area WLBA, the word lines 430 may extend in a second direction (X-axis direction) substantially parallel to the upper surface of the second substrate 410, and may be connected to a plurality of cell contact plugs 440 (including cell contact plugs 441 to 447). The word lines 630 and the cell contact plugs 640 may be connected to each other through pads provided by at least some of the word lines 630 extending in different lengths in the second direction. The first metal layer 450b and the second metal layer 460b may be sequentially connected to upper portions of the cell contact plugs 640 connected to the word lines 630. In the word line bonding area WLBA, the cell contact plugs 440 may be connected to the peripheral circuit area PERI through the upper bonding metals 471b and 472b of the cell area CELL and the lower bonding metals 371b and 372b of the peripheral circuit area PERI.

The cell contact plugs 440 may be electrically connected to the circuit elements 320b providing the row decoder 494 in the peripheral circuit area PERI. In an embodiment, operating voltages of the circuit elements 320b providing the row decoder 494 may be different from operating voltages of the circuit elements 320c providing the page buffer 493. For example, the operating voltages of the circuit elements 320c providing the page buffer 493 may be greater than the operating voltages of the circuit elements 320b providing the row decoder 494.

A common source line contact plug 480 may be disposed in the external pad bonding area PA. The common source line contact plug 480 may be formed of, for example, a metal, a metal compound, or a conductive material such as polysilicon, and may be electrically connected to the common source line 420. The first metal layer 450a and the second metal layer 460a may be sequentially stacked on the common source line contact plug 480. For example, an area in which the common source line contact plug 480, the first metal layer 450a, and the second metal layer 460a are disposed may be defined as the external pad bonding area PA.

In an embodiment, input/output pads 305 and 405 may be disposed in the external pad bonding area PA. A lower insulating layer 301 covering a lower surface of the first substrate 310 may be formed on a lower portion of the first substrate 310, and first input/output pads 305 may be formed on the lower insulating layer 301. The first input/output pad 305 may be connected to at least one of the plurality of circuit elements 320a, 320b, and 320c disposed in the peripheral circuit area PERI through the first input/output contact plug 303, and may be separated from the first substrate 310 by the lower insulating layer 301. In addition, a side insulating layer may be disposed between the first input/output contact plug 303 and the first substrate 310 to electrically separate the first input/output contact plug 303 from the first substrate 310.

An upper insulating layer 401 covering the upper surface of the second substrate 410 may be formed on the upper portion of the second substrate 410, and the second input/output pads 405 may be disposed on the upper insulating layer 401. The second input/output pad 405 may be connected to at least one of the plurality of circuit elements 320a, 320b, and 320c disposed in the peripheral circuit area PERI through the second input/output contact plug 403.

In some embodiments, the second substrate 410 and the common source line 420 are not disposed in the area where the second input/output contact plug 403 is disposed. Also, in some embodiments, the second input/output pad 405 does not overlap the word lines 430 in the third direction (Z-axis direction). The second input/output contact plug 403 may be separated from the second substrate 410 in the direction substantially parallel to the upper surface of the second substrate 410, may penetrate the interlayer insulating layer 415 of the cell area CELL, and may be connected to the second input/output pad 405.

According to embodiments, the first input/output pad 305 and the second input/output pad 405 may be selectively formed. For example, the memory device 400 may include only the first input/output pad 305 disposed on the upper portion of the first substrate 310 or may include only the second input/output pad 405 disposed on the upper portion of second substrate 410. Alternatively, the memory device 400 may include both the first input/output pad 305 and the second input/output pad 405.

In each of the external pad bonding area PA and the bit line bonding area BLBA included in the cell area CELL and the peripheral circuit area PERI, the metal pattern of the uppermost metal layer may exist as a dummy pattern, or the uppermost metal layer may be empty.

In the external pad bonding area PA, the memory device 500 may form a lower metal pattern 373a having the same shape as that of the upper metal pattern 472a of the cell area CELL in the uppermost metal layer of the peripheral circuit area PERI in correspondence to the upper metal pattern 472a formed on the uppermost metal layer of the cell area CELL. In some embodiments, the lower metal pattern 373a formed on the uppermost metal layer of the peripheral circuit area PERI is not connected to a separate contact in the peripheral circuit area PERI. Similarly, in the external pad bonding area PA, the memory device 500 may form an upper metal pattern having the same shape as that of the lower metal pattern of the peripheral circuit area PERI in the upper metal layer of the cell area CELL in correspondence to the lower metal pattern formed on the uppermost metal layer of the peripheral circuit area PERI.

The lower bonding metals 371b and 372b may be formed on the second metal layer 440b of the word line bonding area WLBA. In the word line bonding area WLBA, the lower bonding metals 371b and 372b of the peripheral circuit area PERI may be electrically connected to the upper bonding metals 471b and 472b of the cell area CELL by using the bonding method.

In addition, in the bit line bonding area BLBA, the memory device 500 may form the upper metal pattern 492 having the same shape as that of the metal pattern 352 of the peripheral circuit area PERI on the uppermost metal layer of the cell area CELL in correspondence to the lower metal pattern 352 formed on the uppermost metal layer of the peripheral circuit area PERI. In some embodiments, a contact is not formed on the upper metal pattern 492 formed on the uppermost metal layer of the cell area CELL.

Figure 15:
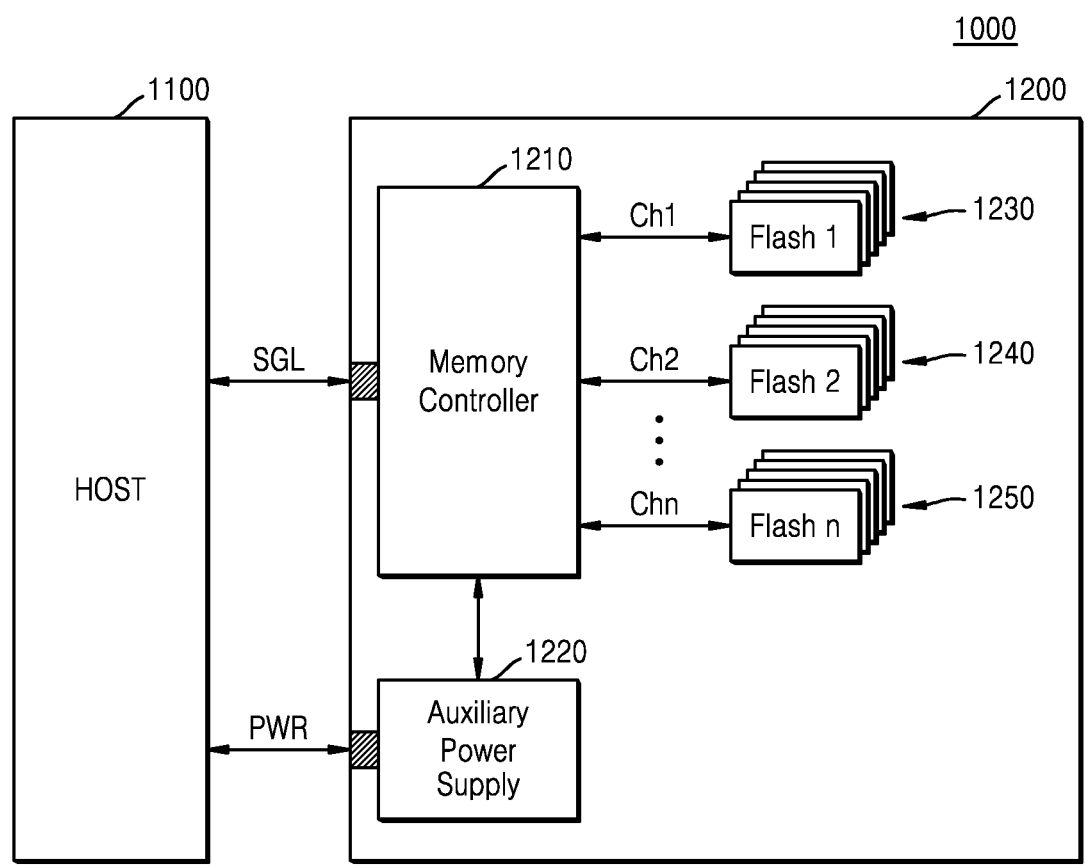
FIG. 15 is a block diagram illustrating a solid state drive (SSD) system according to an embodiment of the inventive concept.

FIG. 15 is a block diagram illustrating a solid state drive (SSD) system 1000 according to an embodiment of the inventive concept.

Referring to FIG. 15, the SSD system 1000 may include a host 1100 and an SSD 1200. The SSD 1200 may exchange a signal SGL with the host 1100 through a signal connector, and may receive power PWR through a power connector.

The SSD 1200 may include a memory controller 1210, an auxiliary power supply 1220, and a plurality of memory devices 1230, 1240, and 1250.

In an embodiment, the memory controller 1210 may be connected to the plurality of memory devices 1230, 1240, and 1250 through channels Ch1, Ch2, and Chn, respectively, to perform a zone management operation according to embodiments of the inventive concept. For example, the memory controller 1210 may divide and compress data received from the host 1100 in a chunk unit, write compressed chunks to the plurality of memory devices 1230, 1240, and 1250, and generate offsets of the compressed chunks. For example, the memory controller 1210 may use a compressed chunk mapping table to directly manage the offsets of the compressed chunks. In another example, the memory controller 1210 may provide the offsets of the compressed chunks to the host 1100, and the host 1100 may directly manage the offsets of the compressed chunks.

In addition, the memory controller 1210 may periodically or aperiodically notify the host 1100 of available capacities of superblocks additionally secured by compressing and writing the chunks, thereby inducing an efficient write operation request of the host 1100. In an embodiment, the memory controller 1210 may change an operation method of zone management for each of the memory devices 1230, 1240, and 1250.

Figure 16:
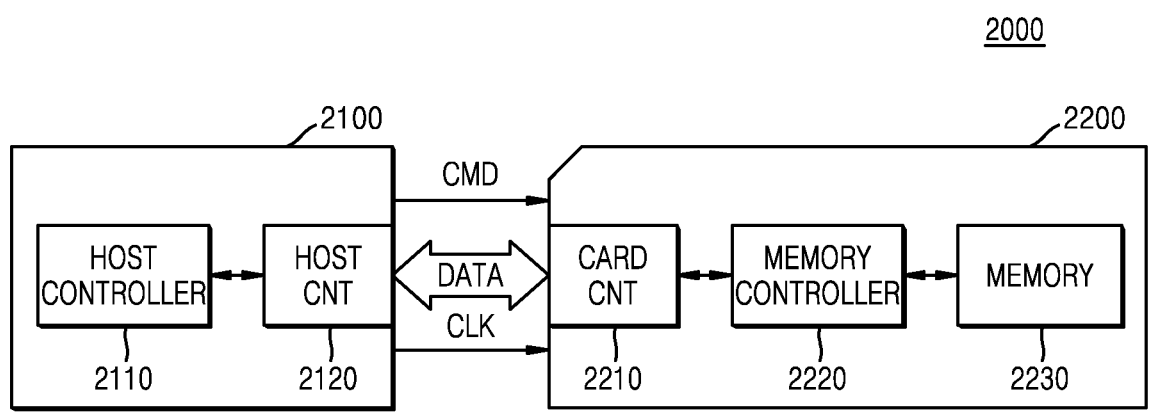
FIG. 16 is a block diagram illustrating a memory card system to which a memory system is applied according to embodiments of the inventive concept.

FIG. 16 is a block diagram illustrating a memory card system 2000 to which a memory system is applied according to embodiments of the inventive concept.

Referring to FIG. 16, the memory card system 2000 may include a host 2100 and a memory card 2200. The host 2100 may include a host controller 2110 and a host connector 2120. The memory card 2200 may include a card connector 2210, a memory controller 2220, and a memory device 2230.

The host 2100 may write data to the memory card 2200 or read data written to the memory card 2200. The host controller 2110 may transmit a command CMD, a clock signal CLK and data DATA generated from a clock generator disposed in the host 2100 to the memory card 2200 through the host connector 2120. The memory card 2200 may provide a zoned namespace interface according to embodiments of the inventive concept to the host 2100.

For example, the memory card 2200 may divide and compress the data DATA received from the host 2100 in a chunk unit, write compressed chunks to the memory device 2230, and generate offsets of the compressed chunks. For example, the memory controller 2220 may use a compressed chunk mapping table to directly manage the offsets of the compressed chunks. In another example, the memory controller 2220 may provide the offsets of the compressed chunks to the host 2100, and the host 2100 may directly manage the offsets of the compressed chunks.

Also, the memory card 2200 may periodically or aperiodically notify the host 2100 of available capacities of superblocks additionally secured by compressing and writing the chunks, thereby inducing an efficient write operation request of the host 2100.

The memory controller 2220 may store data in the memory device 2230 in synchronization with a clock signal generated from a clock generator disposed in the memory controller 2220 in response to a command received through the card connector 2210.

The memory card 2200 may be implemented as, for example, compact flash card (CFC), microdrive, smart media card (SMC), multimedia card (MMC), security digital card (SDC), memory stick, a USB flash memory driver, etc.

As is traditional in the field of the inventive concept, embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, etc., which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions.

In an embodiment of the present inventive concept, a three dimensional (3D) memory array is provided. The 3D memory array is monolithically formed in one or more physical levels of arrays of memory cells having an active area disposed above a silicon substrate and circuitry associated with the operation of those memory cells, whether such associated circuitry is above or within such substrate. The term "monolithic" means that layers of each level of the array are directly deposited on the layers of each underlying level of the array. In an embodiment of the present inventive concept, the 3D memory array includes vertical NAND strings that are vertically oriented such that at least one memory cell is located over another memory cell. The at least one memory cell may include a charge trap layer. The following patent documents, which are hereby incorporated by reference, describe suitable configurations for three-dimensional memory arrays, in which the three-dimensional memory array is configured as a plurality of levels, with word lines and/or bit lines shared between levels: U.S. Pat. Nos. 7,679,133; 8,553,466; 8,654,587; 8,559,235; and US Pat. Pub. No. 2011/0233648.

As data processing technology advances, a host may process massive data at a high speed. Additionally, as memory integration technology advances, the storage device may also store a large amount of data received from the host. In addition, to increase memory usage efficiency, the storage device may compress and store data received from the host, decompress the compressed data, and transmit the compressed data to the host. Referring to a comparative example, the storage device may perform a memory operation so that the host side does not recognize that data is compressed or decompressed. In such an operation according to a comparative example, a large memory space may be used for address conversion because a logical address received from the host is converted into a physical address based on a mapping table in a page unit. Embodiments of the inventive concept account for this by supporting a compression function that reduces the memory used for conversion of the logical address into the physical address, as described above.

While the inventive concept has been particularly shown and described with reference to embodiments thereof, it will be understood that various changes in form and detail may be made therein without departing from the spirit and scope of the inventive concept as defined by the following claims.

What is claimed is:

1. A storage device, comprising:
a memory device comprising a plurality of memory blocks; and
a memory controller configured to:
control a memory operation performed on the memory device by dividing the plurality of memory blocks into a plurality of superblocks,
write a first compressed chunk generated by compressing a first chunk comprising data requested by a host to be written to a first superblock selected based on a first logical address received from the host among the plurality of superblocks, and
generate a location-related offset of the first compressed chunk in the first superblock, wherein the first compressed chunk comprises a compression algorithm, a size of the first compressed chunk, and a number of pages included in the first chunk.

2. The storage device of claim 1, wherein the location-related offset of the first compressed chunk comprises a start physical address of the first compressed chunk in the first superblock.

3. The storage device of claim 1, wherein the memory controller is further configured to transmit, to the host, information indicating a currently available capacity of the first superblock, after writing the first compressed chunk to the first superblock.

4. The storage device of claim 1, wherein the memory controller is further configured to read more pages than pages included in the first compressed chunk corresponding to the data from the first superblock, in response to a read request for the data from the host.

5. The storage device of claim 1, wherein the memory controller is further configured to manage a compressed chunk mapping table indicating mapping relationships between an index of the first superblock, an index of the first compressed chunk, and the location-related offset.

6. The storage device of claim 5, wherein the memory controller is further configured to control a read operation performed on the memory device based on a second logical address received from the host and the compressed chunk mapping table, in response to a read request for the data from the host.

7. The storage device of claim 1, wherein the memory controller is further configured to transmit, to the host, address information comprising an index of a zone corresponding to the first superblock, the location-related offset of the first compressed chunk, and an index of at least one page corresponding to the data.

8. The storage device of claim 1,
wherein the plurality of superblocks further comprise a second superblock to which a second compressed chunk is written, and
the memory controller is further configured to perform garbage collection by writing a target compressed chunk generated by compressing a target chunk comprising valid data of the second compressed chunk to any one of the plurality of superblocks.

9. The storage device of claim 8, wherein the memory controller is further configured to update a compressed chunk mapping table based on a location-related offset of the target compressed chunk in the superblock to which the target compressed chunk is written.

10. The storage device of claim 8, wherein the memory controller is further configured to transmit, to the host, address information comprising an index of a zone corresponding to the superblock to which the target compressed chunk is written, a location-related offset of the target compressed chunk, and an index of at least one page corresponding to the valid data.

11. A data processing system, comprising:
a storage device comprising a plurality of memory blocks and configured to perform a memory operation by dividing the plurality of memory blocks into a plurality of superblocks; and
a host processor configured to:
operate the storage device in a zoned namespace,
recognize the storage device as a plurality of zones, each comprising a plurality of chunks, and
provide a memory operation request to the storage device,
wherein the storage device is further configured to:
write a plurality of compressed chunks generated by compressing the plurality of chunks to the plurality of superblocks respectively corresponding to the plurality of zones, and manage location-related offsets of the plurality of compressed chunks in the plurality of superblocks,
wherein the storage device is further configured to manage a compressed chunk mapping table indicating mapping relationships between indexes of the plurality of superblocks, indexes of the plurality of compressed chunks, and the location-related offsets of the plurality of compressed chunks, and
perform a read operation requested by the host processor based on the compressed chunk mapping table.

12. The data processing system of claim 11,
wherein the location-related offsets of the plurality of compressed chunks comprise start physical addresses of the plurality of compressed chunks in the plurality of superblocks, and
the storage device is further configured to find the plurality of compressed chunks based on a manner in which the plurality of compressed chunks are sequentially written in the plurality of superblocks and the location-related offsets of the plurality of compressed chunks.

13. The data processing system of claim 11, wherein the storage device is further configured to perform garbage collection on at least one of the plurality of compressed chunks based on valid page information received from the host processor, and update the compressed chunk mapping table based on a result of the garbage collection.

14. The data processing system of claim 11, wherein the storage device is further configured to transmit first address information comprising the location-related offsets of the plurality of compressed chunks to the host processor.

15. The data processing system of claim 14, wherein the storage device is further configured to perform garbage collection on at least one of the plurality of compressed chunks based on valid page information received from the host processor, and transmit, to the host processor, second address information comprising changed offsets among the location-related offsets of the plurality of compressed chunks.

16. The data processing system of claim 11,
wherein the storage device is further configured to transmit, to the host processor, information indicating an available capacity of a target superblock to which a target compressed chunk is written according to a request of the host processor among the plurality of superblocks, and the host processor is further configured to request a write operation with respect to the storage device based on the information.

17. The data processing system of claim 16, wherein the host processor is further configured to transmit, to the storage device, a write request for using the available capacity of the target superblock subsequent to a request.

18. A storage device, comprising:
a memory device comprising a plurality of memory blocks; and
a memory controller configured to:
control a memory operation performed on the memory device by dividing the plurality of memory blocks into a plurality of superblocks,
write a first compressed chunk generated by compressing a first chunk comprising first data requested by a host to be written to a first superblock selected based on a first logical address received from the host among the plurality of superblocks, and
transmit first information indicating a current first available capacity of the first superblock to the host,
wherein the memory controller is further configured to manage a compressed chunk mapping table indicating mapping relationships between an index of the first superblock, an index of the first compressed chunk, and a location-related offset of the first compressed chunk in the first superblock.

* * * * *